US008828510B2

(12) United States Patent
Cole et al.

(10) Patent No.: US 8,828,510 B2
(45) **Date of Patent: *Sep. 9, 2014**

(54) MICROWAVE COOKING PACKAGES AND METHODS OF MAKING THEREOF

(71) Applicant: Graphic Packaging International, Inc., Atlanta, GA (US)

(72) Inventors: Lorin R. Cole, Larsen, WI (US); Timothy H. Bohrer, Chicago, IL (US); Scott W. Middleton, Oshkosh, WI (US); Richard G. Robison, Gray, TN (US); Terrence P. Lafferty, Neenah, WI (US); Brian R. O'Hagan, Appleton, WI (US); Patrick H. Wnek, Sherwood, WI (US)

(73) Assignee: Graphic Packaging International, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,192

(22) Filed: Apr. 1, 2013

(65) Prior Publication Data

US 2013/0221012 A1 Aug. 29, 2013

Related U.S. Application Data

(60) Division of application No. 11/981,359, filed on Oct. 31, 2007, now Pat. No. 8,440,275, which is a continuation of application No. 11/054,633, filed on Feb. 9, 2005, now Pat. No. 7,365,292.

(60) Provisional application No. 60/543,364, filed on Feb. 9, 2004.

(51) Int. Cl.
*B32B 1/02* (2006.01)
*B32B 1/08* (2006.01)

(52) U.S. Cl.
USPC ....... 428/34.2; 428/34.1; 428/35.7; 428/35.9; 428/36.9

(58) Field of Classification Search
USPC .................... 428/34.1, 34.2, 35.7, 35.9, 36.9
See application file for complete search history.

(56) References Cited

U.S. PATENT DOCUMENTS

| | | | |
|---|---|---|---|
| 3,098,583 | A | 7/1963 | Sherman et al. |
| 3,439,428 | A | 4/1969 | Zelnick |

(Continued)

FOREIGN PATENT DOCUMENTS

| | | | |
|---|---|---|---|
| EP | 0 312 333 | | 4/1989 |
| EP | 0 421 710 | A2 | 10/1991 |

(Continued)

OTHER PUBLICATIONS

PCT/US03/03779—International Search Report & Written Opinion, Jul. 29, 2003, Graphic Packaging Corporation.

(Continued)

*Primary Examiner* — Marc Patterson

(74) *Attorney, Agent, or Firm* — Womble Carlyle Sandridge & Rice, LLP

(57) ABSTRACT

A package with self-forming insulating walls includes a tray for supporting a food item, a flap joined to the tray along a fold line, and an insulating microwave material overlying at least a portion of the tray and at least a portion of the flap. The insulating microwave material may be joined to the flap. The insulating microwave material may include a microwave energy interactive material supported on a first polymer film layer, a moisture-containing layer joined to the microwave energy interactive material, and a second polymer film layer joined to the moisture-containing layer in a predetermined pattern, thereby defining a plurality of expandable cells between the moisture-containing layer and the second polymer film layer.

25 Claims, 26 Drawing Sheets

(56) References Cited

U.S. PATENT DOCUMENTS

| | | | |
|---|---|---|---|
| 3,595,468 | A | 7/1971 | Repko |
| 3,601,252 | A | 8/1971 | Sager |
| 3,967,998 | A | 7/1976 | Kane |
| 3,973,045 | A | 8/1976 | Brandberg et al. |
| 4,013,798 | A | 3/1977 | Goltsos |
| 4,132,811 | A | 1/1979 | Standing et al. |
| 4,196,331 | A | 4/1980 | Leveckis et al. |
| 4,220,684 | A | 9/1980 | Olson |
| 4,260,060 | A | 4/1981 | Faller |
| 4,267,420 | A | 5/1981 | Brastad |
| 4,267,955 | A | 5/1981 | Struble |
| 4,268,738 | A | 5/1981 | Flautt, Jr. et al. |
| 4,283,427 | A | 8/1981 | Winters et al. |
| 4,286,136 | A | 8/1981 | Mason, Jr. |
| 4,461,031 | A | 7/1984 | Blamer |
| 4,571,337 | A | 2/1986 | Cage et al. |
| 4,574,174 | A | 3/1986 | McGonigle |
| 4,641,005 | A | 2/1987 | Seiferth |
| 4,691,374 | A | 9/1987 | Watkins et al. |
| 4,745,249 | A | 5/1988 | Daniels |
| 4,775,771 | A | 10/1988 | Pawlowski |
| 4,777,053 | A | 10/1988 | Tobelmann et al. |
| 4,785,937 | A | 11/1988 | Tamezawa et al. |
| 4,786,513 | A | 11/1988 | Monforton et al. |
| 4,825,025 | A | 4/1989 | Seiferth |
| 4,848,931 | A | 7/1989 | Kamada et al. |
| 4,851,632 | A | 7/1989 | Kaliski |
| 4,865,921 | A | 9/1989 | Hollenberg et al. |
| 4,883,936 | A | 11/1989 | Maynard et al. |
| 4,890,439 | A | 1/1990 | Smart |
| 4,894,247 | A | 1/1990 | Fong |
| 4,911,938 | A | 3/1990 | Fisher et al. |
| 4,914,266 | A | 4/1990 | Parks et al. |
| 4,916,280 | A | 4/1990 | Havette |
| 4,933,193 | A | 6/1990 | Fisher |
| 4,936,935 | A | 6/1990 | Beckett |
| 4,943,456 | A | 7/1990 | Pollart et al. |
| 4,950,859 | A | 8/1990 | Anderson |
| 4,962,293 | A | 10/1990 | Lackey |
| 4,963,424 | A | 10/1990 | Beckett |
| 4,968,865 | A | 11/1990 | Seaborne |
| 4,970,358 | A | 11/1990 | Brandberg et al. |
| 4,970,360 | A | 11/1990 | Pesheck et al. |
| 4,973,810 | A | 11/1990 | Brauner |
| 5,003,142 | A | 3/1991 | Fuller |
| 5,006,684 | A | 4/1991 | Wendt et al. |
| 5,039,364 | A | 8/1991 | Beckett |
| 5,041,295 | A | 8/1991 | Perry et al. |
| 5,041,325 | A | 8/1991 | Larson et al. |
| 5,044,777 | A | 9/1991 | Watkins et al. |
| 5,053,594 | A | 10/1991 | Thota et al. |
| 5,059,279 | A | 10/1991 | Wilson |
| 5,070,173 | A | 12/1991 | Yokota et al. |
| 5,077,455 | A | 12/1991 | Peleg et al. |
| 5,081,330 | A | 1/1992 | Brandberg et al. |
| 5,084,601 | A | 1/1992 | Andreas et al. |
| 5,097,107 | A | 3/1992 | Watkins et al. |
| 5,117,078 | A | 5/1992 | Beckett |
| 5,124,519 | A | 6/1992 | Roy et al. |
| 5,164,562 | A | 11/1992 | Huffman et al. |
| 5,177,332 | A | 1/1993 | Fong |
| 5,180,894 | A | 1/1993 | Quick et al. |
| 5,189,272 | A | 2/1993 | McDonald et al. |
| 5,213,902 | A | 5/1993 | Beckett |
| 5,217,768 | A | 6/1993 | Walters et al. |
| 5,221,419 | A | 6/1993 | Beckett |
| 5,230,914 | A | 7/1993 | Akervik |
| 5,231,268 | A | 7/1993 | Hall et al. |
| 5,239,153 | A | 8/1993 | Beckett |
| 5,241,150 | A | 8/1993 | Garvey et al. |
| 5,256,846 | A | 10/1993 | Walters |
| 5,260,536 | A | 11/1993 | Peery |
| 5,260,537 | A | 11/1993 | Beckett |
| 5,266,386 | A | 11/1993 | Beckett |
| 5,294,763 | A | 3/1994 | Chamberlain et al. |
| 5,294,765 | A | 3/1994 | Archibald et al. |
| 5,298,708 | A | 3/1994 | Babu et al. |
| 5,317,118 | A | 5/1994 | Brandberg et al. |
| RE34,683 | E | 8/1994 | Maynard et al. |
| 5,338,921 | A | 8/1994 | Maheux et al. |
| 5,340,436 | A | 8/1994 | Beckett |
| 5,354,973 | A | 10/1994 | Beckett |
| 5,357,086 | A | 10/1994 | Turpin et al. |
| 5,389,767 | A | 2/1995 | Dobry |
| 5,405,663 | A | 4/1995 | Archibald et al. |
| 5,410,135 | A | 4/1995 | Pollart |
| 5,424,517 | A | 6/1995 | Habeger et al. |
| 5,428,209 | A | 6/1995 | Babu et al. |
| 5,446,270 | A | 8/1995 | Chamberlain et al. |
| 5,484,984 | A | 1/1996 | Gics |
| 5,489,766 | A | 2/1996 | Walters et al. |
| 5,510,132 | A | 4/1996 | Gallo, Jr. |
| 5,514,854 | A | 5/1996 | Atsaves |
| 5,519,195 | A | 5/1996 | Keefer et al. |
| 5,543,606 | A | 8/1996 | Gics |
| 5,565,125 | A | 10/1996 | Parks |
| 5,628,921 | A | 5/1997 | Beckett |
| 5,630,959 | A | 5/1997 | Owens |
| 5,672,407 | A | 9/1997 | Beckett |
| 5,688,427 | A | 11/1997 | Gallo, Jr. |
| 5,690,853 | A | 11/1997 | Jackson et al. |
| 5,759,422 | A | 6/1998 | Schmelzer |
| 5,773,801 | A | 6/1998 | Blamer et al. |
| 5,780,824 | A | 7/1998 | Matos |
| 5,800,724 | A | 9/1998 | Habeger |
| 5,916,470 | A | 6/1999 | Besser et al. |
| 5,921,681 | A | 7/1999 | Money |
| 5,932,680 | A | 8/1999 | Heider |
| 5,965,662 | A | 10/1999 | Krebs et al. |
| 5,994,685 | A | 11/1999 | Jackson et al. |
| 6,005,234 | A | 12/1999 | Moseley et al. |
| 6,016,950 | A | 1/2000 | Money |
| 6,060,096 | A | 5/2000 | Hanson et al. |
| 6,090,706 | A | 7/2000 | Telford et al. |
| 6,093,920 | A | 7/2000 | Beckwith |
| 6,100,513 | A | 8/2000 | Jackson et al. |
| 6,114,679 | A | 9/2000 | Lai et al. |
| 6,133,560 | A | 10/2000 | Zeng et al. |
| 6,137,098 | A | 10/2000 | Moseley et al. |
| 6,150,646 | A | 11/2000 | Lai |
| 6,204,492 | B1 | 3/2001 | Zeng et al. |
| 6,251,451 | B1 | 6/2001 | Zeng |
| 6,303,913 | B1 | 10/2001 | Bono et al. |
| 6,303,914 | B1 | 10/2001 | Bono et al. |
| 6,335,042 | B1 | 1/2002 | Money |
| 6,359,272 | B1 | 3/2002 | Sadek et al. |
| 6,414,288 | B1 | 7/2002 | Bono et al. |
| 6,414,290 | B1 | 7/2002 | Cole et al. |
| 6,431,365 | B1 | 8/2002 | Money |
| 6,433,322 | B2 | 8/2002 | Zeng |
| 6,436,457 | B1 | 8/2002 | Poss |
| 6,455,827 | B2 | 9/2002 | Zeng |
| 6,486,455 | B1 | 11/2002 | Merabet |
| 6,488,973 | B1 | 12/2002 | Wright |
| 6,501,059 | B1 | 12/2002 | Mast |
| 6,552,315 | B2 | 4/2003 | Zeng |
| 6,677,563 | B2 | 1/2004 | Lai |
| 6,683,289 | B2 | 1/2004 | Whitmore et al. |
| 6,717,121 | B2 | 4/2004 | Zeng |
| 6,744,028 | B2 | 6/2004 | Chisholm et al. |
| 6,765,182 | B2 | 7/2004 | Cole |
| 6,896,919 | B2 | 5/2005 | Wright |
| 7,015,442 | B2 | 3/2006 | Tucker, Jr. et al. |
| 7,019,271 | B2 | 3/2006 | Wnek et al. |
| 7,038,182 | B2 | 5/2006 | Young et al. |
| 7,351,942 | B2 | 4/2008 | Wnek et al. |
| 7,365,292 | B2 | 4/2008 | Cole et al. |
| 7,541,562 | B2 | 6/2009 | Cole et al. |
| 7,812,293 | B2 | 10/2010 | Su et al. |
| 7,868,274 | B2 | 1/2011 | Bohme et al. |
| 7,923,669 | B2 | 4/2011 | Wnek et al. |
| 8,440,275 | B2 * | 5/2013 | Cole et al. .................... 428/34.2 |
| 8,563,906 | B2 * | 10/2013 | Wnek et al. ................... 219/730 |
| 2003/0017235 | A1 | 1/2003 | Wright |

(56) References Cited

U.S. PATENT DOCUMENTS

| | | | |
|---|---|---|---|
| 2003/0071036 | A1 | 4/2003 | Savage et al. |
| 2003/0111463 | A1 | 6/2003 | Lai |
| 2003/0206997 | A1 | 11/2003 | Winkelman et al. |
| 2004/0022984 | A1 | 2/2004 | Abe et al. |
| 2004/0052993 | A1 | 3/2004 | Dawes |
| 2004/0130788 | A1 | 7/2004 | Minami |
| 2004/0171767 | A1 | 9/2004 | Pohlmann et al. |
| 2004/0173607 | A1 | 9/2004 | Blankenbeckler et al. |
| 2005/0079252 | A1 | 4/2005 | Kendig et al. |
| 2005/0173425 | A1 | 8/2005 | Wnek et al. |
| 2005/0205565 | A1 | 9/2005 | Cole et al. |
| 2005/0267245 | A1 | 12/2005 | Sandusky et al. |
| 2006/0049190 | A1 | 3/2006 | Middleton et al. |
| 2006/0113300 | A1 | 6/2006 | Wnek et al. |
| 2006/0252865 | A1 | 11/2006 | Bush et al. |
| 2006/0289521 | A1 | 12/2006 | Bohme |
| 2007/0023426 | A1 | 2/2007 | Russell et al. |
| 2007/0215610 | A1 | 9/2007 | Su et al. |
| 2008/0047958 | A1 | 2/2008 | Cole et al. |
| 2008/0078759 | A1 | 4/2008 | Wnek et al. |
| 2008/0081095 | A1 | 4/2008 | Cole et al. |
| 2008/0105688 | A1 | 5/2008 | Hopkins |
| 2008/0135544 | A1 | 6/2008 | Lafferty et al. |
| 2008/0146749 | A1 | 6/2008 | Pohlmann et al. |
| 2008/0197128 | A1 | 8/2008 | Files et al. |
| 2008/0214339 | A1 | 9/2008 | McInnis et al. |
| 2008/0241529 | A1 | 10/2008 | Bauer et al. |
| 2008/0280145 | A1 | 11/2008 | Paschkowski et al. |
| 2009/0061053 | A1 | 3/2009 | Gaylor et al. |
| 2009/0120929 | A1 | 5/2009 | Lafferty |
| 2009/0242550 | A1 | 10/2009 | Schneider |
| 2009/0277899 | A1 | 11/2009 | Cole |
| 2010/0072197 | A1 | 3/2010 | Neff et al. |
| 2010/0260900 | A1 | 10/2010 | DeVerney et al. |
| 2011/0147377 | A1 | 6/2011 | Wnek et al. |
| 2011/0226761 | A1 | 9/2011 | Romeo et al. |
| 2011/0233202 | A1 | 9/2011 | Robison et al. |

FOREIGN PATENT DOCUMENTS

| | | | |
|---|---|---|---|
| GB | 2 207 589 | A | 2/1989 |
| JP | H05-504650 | | 7/1993 |
| JP | 6-508878 | | 10/1994 |
| JP | 7-505109 | | 6/1995 |
| JP | 2001-139069 | | 5/2001 |
| WO | WO 91/07861 | | 5/1991 |
| WO | WO 91/10337 | | 7/1991 |
| WO | WO 92/09503 | | 6/1992 |
| WO | WO 93/01247 | | 1/1993 |
| WO | WO 93/19566 | | 9/1993 |
| WO | WO 97/11010 | | 3/1997 |
| WO | WO 97/26778 | | 7/1997 |
| WO | WO 00/50318 | | 8/2000 |
| WO | WO 03/053106 | | 6/2003 |
| WO | WO 03/066435 | A2 | 8/2003 |
| WO | WO 2005/077783 | | 8/2005 |
| WO | WO 2006/113403 | | 10/2006 |
| WO | WO 2009/120739 | | 10/2009 |

OTHER PUBLICATIONS

PCT/US2003/003779—International Preliminary Examination Report, Feb. 12, 2004, Graphic Packaging International, Inc.

PCT/US2005/004148—International Search Report & Written Opinion, Jul. 7, 2005, Graphic Packaging International, Inc.

PCT/US05/04148—International Preliminary Report on Patentability, Jan. 31, 2006, Graphic Packaging International, Inc.

PCT/US06/01410—International Search Report & Written Opinion, Dec. 4, 2007, Graphic Packaging International, Inc.

PCT/US2009/038178—International Search Report & Written Opinion, Sep. 25, 2009, Graphic Packaging International, Inc.

PCT/2009/038178—International Preliminary Report on Patentability, Sep. 28, 2010, Graphic Packaging International, Inc.

* cited by examiner

MICROWAVE COOKING PACKAGES AND METHODS OF MAKING THEREOF

CROSS-REFERENCE TO RELATED APPLICATIONS

This application is a divisional of U.S. patent application Ser. No. 11/981,359, filed Oct. 31, 2007, now U.S. Pat. No. 8,440,275, which is a continuation of U.S. application Ser. No. 11/054,633, filed Feb. 9, 2005, now U.S. Pat. No. 7,365, 292, which claims the benefit of U.S. Provisional Application No. 60/543,364, filed Feb. 9, 2004, all of which are incorporated by reference herein in their entirety.

TECHNICAL FIELD

The present invention relates to the field of food preparation, and in particular, relates to materials and constructs that may be used to prepare foods in a microwave oven.

BACKGROUND

Microwave ovens commonly are used to cook food in a rapid and effective manner. To optimize the cooking performance of microwave ovens, various food packaging arrangements have been developed to block, enhance, direct, and otherwise affect microwave interaction with food.

If browning or crisping of the exterior of the food item is desired, the food item is placed in a container that includes a susceptor. The susceptor typically includes a microwave energy interactive material, such as a metal, that absorbs, reflects, and transmits microwave energy in varying proportions. The surface to be browned is placed proximate the susceptor. The susceptor absorbs the microwave energy, and transmits heat to the food item to promote surface browning and crisping. Further, some of the microwave energy is transmitted to the inside of the food item.

Numerous susceptor configurations, shapes, and sizes are known in the art. Depending on the susceptor arrangement, the time of exposure to microwave energy, the desired degree of browning and crisping, and other factors, the susceptor may be in intimate or proximate contact with the food item. Thus, a material or package including a susceptor may be used to cook a food item, and to brown or crisp the surface of the food item in a way similar to conventional frying, baking, or grilling.

One particular food packaging arrangement that may employ susceptors involves closed cells formed between layers of packaging material. Upon exposure to microwave energy, the cells expand to form inflated cells that insulate the food item in the package from the microwave environment. One example of a microwave packaging material that provides inflatable cells is described in International Application Publication No. WO 03/066435A2, published Aug. 14, 2003, which is hereby incorporated by reference herein.

Despite these advances, numerous challenges in microwave cooking remain. For example, removal of large objects from a microwave oven, if not properly supported, can be difficult. If a flat tray supporting a pizza is grasped along only one side and lifted from the oven, the tray might bend and cause the pizza to slide off the tray. Additionally, many packages are fixed in shape and do not provide sufficient intimate or proximate contact with the food item to brown or crisp the surface of the food item. Some packages provide partitions to increase contact with the food item but, in many cases, the shape and size of the partitions are adapted to a standard or nominal food item size that does not accommodate any variation in the size of the food item. For example, if the cross sectional size of a portion of French fries varies, only a portion of the fries will contact the microwave interactive components of the package. Thus, there remains a need for improved microwave energy interactive packages.

SUMMARY

The present invention generally relates to materials and packages, and methods of making such materials and packages, for use with microwaveable food items. In various aspects, an insulating material is used. In one aspect, the present invention involves a microwave sheet with a self-sealing feature to provide a partially sealed food wrap after the sheet is exposed to microwave energy. In another aspect, the present invention involves a microwave sheet or package employing variably sized and variably expansive cells for use in shipping, microwave cooking, and other uses. In another aspect, the present invention is directed to a microwave tray with side walls that form upon exposure to microwave energy. The present invention also relates to an insulating microwave material or other microwave packaging material with an oxygen barrier. Further, the present invention relates to insulating microwave material or other microwave packaging material formed at least in part with a thermo-mechanical device. The present invention also includes a method of wrapping a food item in an insulating microwave material and, optionally, a protective overwrap. Finally, the present invention includes a package with a lid that can be tucked under the package during microwave cooking to provide additional insulation and heating.

DESCRIPTION

The present invention relates generally to various aspects of materials and packages for microwave cooking of food items, and methods of making such materials and packages. Although several different inventions, aspects, implementations, and embodiments of the various inventions are provided, numerous interrelationships between, combinations thereof, and modifications of the various inventions, aspects, implementations, and embodiments of the inventions are contemplated hereby.

According to various aspects of the present invention, an insulating material is used to form numerous constructs for microwave cooking and packaging of foods. As used herein, an “insulating microwave material” refers to any arrangement of layers, such as polyester layers, susceptor or “microwave interactive” layers, polymer layers, paper layers, continuous and discontinuous adhesive layers, and patterned adhesive layers, that provides an insulating effect. The sheet or package may include one or more susceptors, one or more expandable insulating cells, or a combination of susceptors and expandable insulating cells. Examples of materials that may be suitable, alone or in combination, include, but are not limited to, are QwikWave® Susceptor, QwikWave® Focus, Micro-Rite®, MicroFlex® Q, and QuiltWave™ susceptor, each of which is commercially available from Graphic Packaging International, Inc.

An exemplary insulating material 10 is depicted in FIGS. 1A-1D. In each of the examples shown herein, it should be understood that the layer widths are not necessarily shown in perspective. In some instances, for example, the adhesive layers are very thin with respect to other layers, but are nonetheless shown with some thickness for purposes of clearly illustrating the arrangement of layers.

Figure 1A:
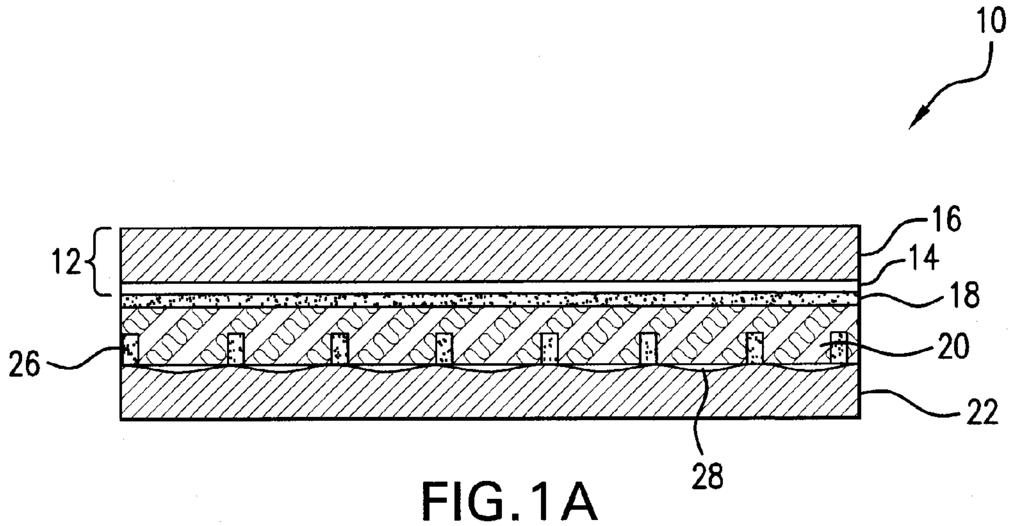
FIG. 1A is a cross-sectional view of an insulating microwave material that may be used in accordance with the present invention.

Referring to FIG. 1A, the material 10 may be a combination of several different material layers. A susceptor, which typically includes a thin layer of microwave interactive material 14 on a first plastic film 16, is bonded for example, by lamination with an adhesive (not shown), to a dimensionally stable substrate 20, for example, paper. The substrate 20 is bonded to a second plastic film 22 using a patterned adhesive 26 or other material, such that closed cells 28 are formed in the material 10. The closed cells 28 are substantially resistant to vapor migration.

Figure 1B:
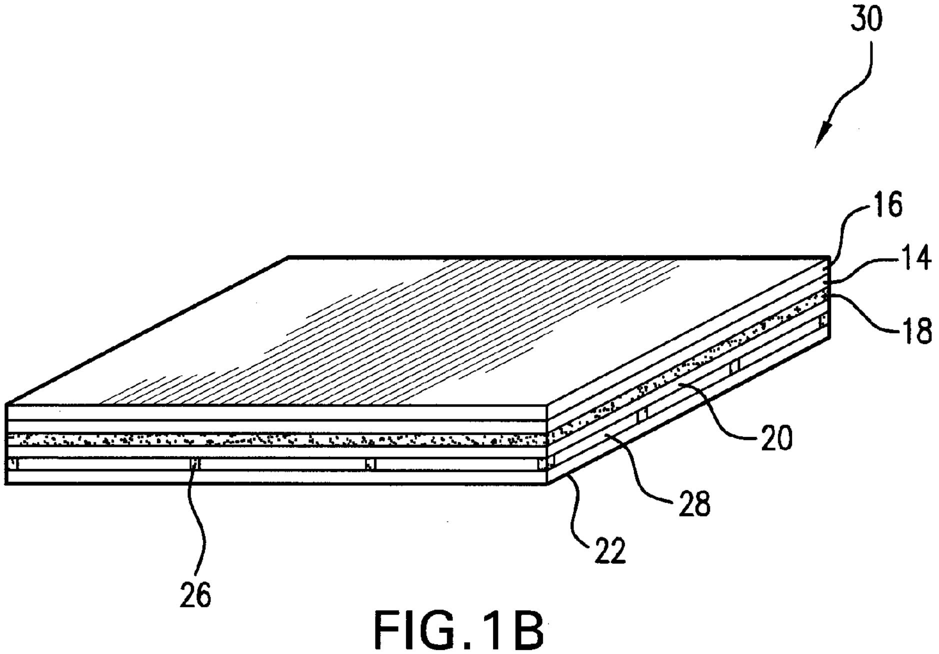
FIG. 1B is a perspective view of the insulating microwave material of FIG. 1A.
Figure 1C:
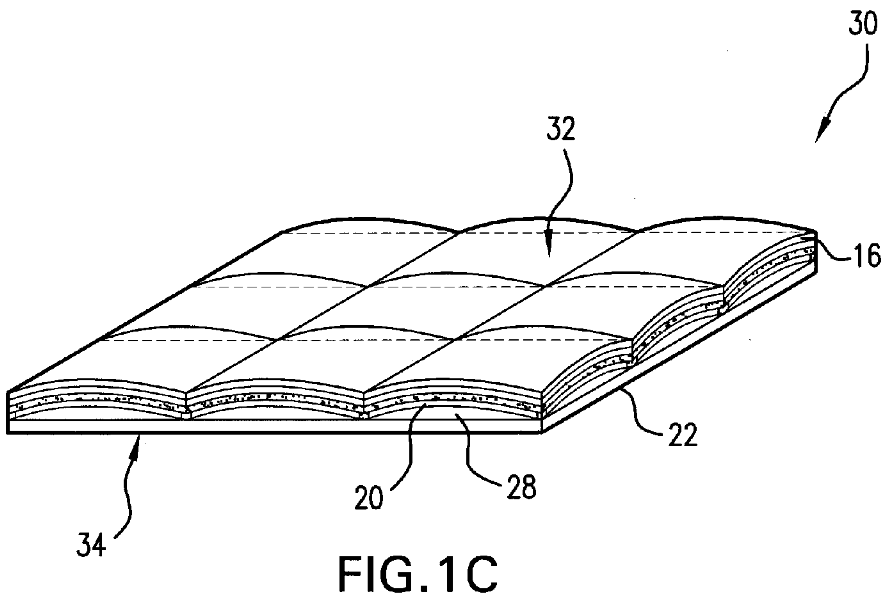
FIG. 1C is a perspective view of the insulating microwave material of FIG. 1A after exposure to microwave energy.
Figure 1D:
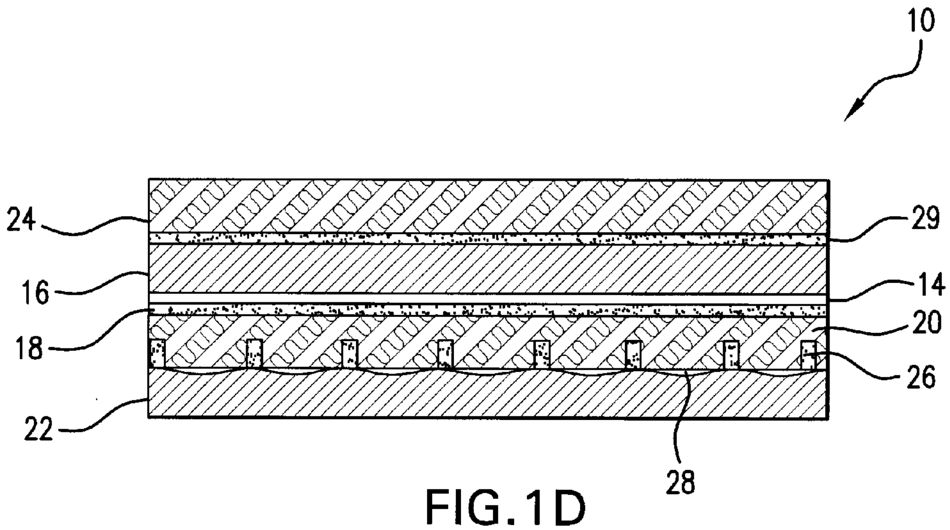
FIG. 1D is a cross-sectional view of an alternative insulating microwave material that may be used in accordance with the present invention.

Optionally, an additional substrate layer 24 may be adhered by adhesive or otherwise to the first plastic film 16 opposite the microwave interactive material 14, as depicted in FIG. 1D. The additional substrate layer 24 may be a layer of paper or any other suitable material, and may be provided to shield the food item (not shown) from any flakes of susceptor film that craze and peel away from the substrate during heating. The insulating material 10 provides a substantially flat, multilayered sheet 30, as shown in FIG. 1B.

FIG. 1C depicts the sheet 30 of insulating material 10 of FIG. 1B after being subjected to microwave energy from a microwave oven (not shown). As the susceptor film 12 heats upon impingement by microwave energy, water vapor and other gases normally held in the substrate 20, for example, paper, and any air trapped in the thin space between the second plastic film 22 and the substrate 20 in the closed cells 28, expand. The expansion of water vapor and air in the closed cells 28 applies pressure on the susceptor film 12 and the substrate 20 on one side and the second plastic film 22 on the other side of the closed cells 28. Each side of the material 10 forming the closed cells 28 reacts simultaneously, but uniquely, to the heating and vapor expansion. The cells 28 expand or inflate to form a quilted top surface 32 of pillows separated by channels (not shown) in the susceptor film 12 and substrate 20 lamination, which lofts above a bottom surface 34 formed by the second plastic film 22. This expansion may occur within 1 to 15 seconds in an energized microwave oven, and in some instances, may occur within 2 to 10 seconds.

Figure 2:
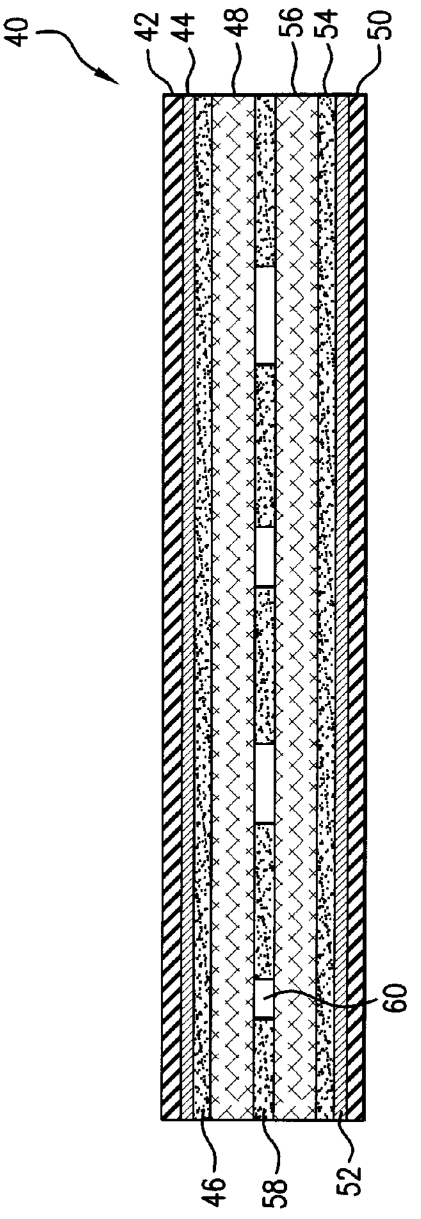
FIG. 2 is a cross-sectional view of yet another alternative microwave insulating material in accordance with one aspect of the present invention, and that may be used in accordance with the present invention.
Figure 3:
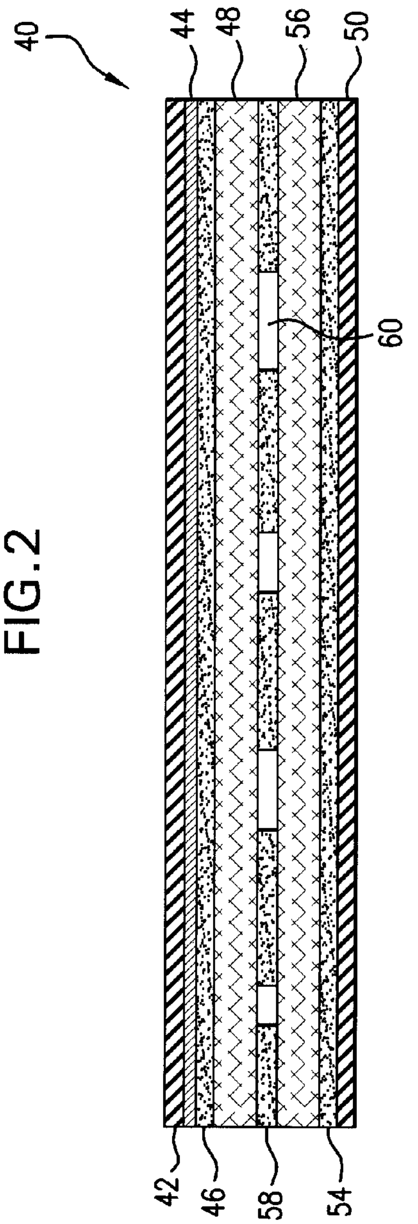
FIG. 3 is a cross-sectional view of still another alternative microwave insulating material in accordance with one aspect of the present invention, and that may be used in accordance with the present invention.

FIGS. 2 and 3 depict alternative exemplary microwave insulating material layer configurations that may be suitable for use with any of the various sheet, packaging, and other constructs of the present invention. Referring first to FIG. 2, an insulating microwave material 40 is shown with two symmetrical layer arrangements adhered together by a patterned adhesive layer. The first symmetrical layer arrangement, beginning at the top of the drawings, comprises a PET film layer 42, a metal layer 44, an adhesive layer 46, and a paper or paperboard layer 48. The metal layer 44 may comprise a metal, such as aluminum, deposited along a portion or all of the PET film layer 42. The PET film 42 and metal layer 44 together define a susceptor. The adhesive layer 46 bonds the PET film 42 and the metal layer 44 to the paperboard layer 48.

The second symmetrical layer arrangement, beginning at the bottom of the drawings, also comprises a PET film layer 50, a metal layer 52, an adhesive layer 54, and a paper or paperboard layer 56. If desired, the two symmetrical arrangements may be formed by folding one layer arrangement onto itself. The layers of the second symmetrical layer arrangement are bonded together in a similar manner as the layers of the first symmetrical arrangement. A patterned adhesive layer 58 is provided between the two paper layers 48 and 56, and defines a pattern of closed cells 60 configured to expand when exposed to microwave energy. In one aspect, an insulating material 10 having two metal layers 44 and 52 according to the present invention generates more heat and greater cell loft.

Referring to FIG. 3, yet another insulating microwave material 40 is shown. The material 40 may include a PET film layer 42, a metal layer 44, an adhesive layer 46, and a paper layer 48. Additionally, the material 40 may include a clear PET film layer 50, an adhesive 54, and a paper layer 56. The layers are adhered or affixed by a patterned adhesive 58 defining a plurality of closed expandable cells 60.

Use of any of the exemplary insulating materials to package and/or cook a food item provides several benefits before, during, and after heating in a microwave oven. First, the water vapor and air contained in the closed cells provides insulation between the food item and the interior surfaces of the microwave oven. The base of a microwave oven, for example, the glass tray found in most microwave ovens, acts as a large heat sink, absorbing much of the heat generated by the susceptor film or within the food item itself. The vapor pockets in the pillows formed by the present invention maybe used to insulate the food item and susceptor film from the microwave oven surfaces and the vented air in the microwave oven cavity, thereby increasing the amount of heat that stays within or is transferred to the food item.

Second, the formation of the pillows allows the material to conform more closely to the surface of the food item, placing the susceptor film in greater proximity to the food item. This enhances the ability of the susceptor film to brown and crisp the surface of the food item by conduction heating, in addition to some convection heating, of the food item.

Further, the insulating materials contemplated hereby may be desirable as a packaging material because it adds little bulk to the finished package, yet is transformed into a bulk insulating material without any consumer preparation before cooking.

I. Self-Sealing Microwave Sheet

According to one aspect of the present invention, a sheet of microwave packaging material is provided with an "activatable adhesive". As used herein, the phrase "activatable adhesive" refers to any bonding agent or adhesive that bonds to itself or a material when exposed to microwave energy or heat. The food item is wrapped in the sheet and heated in a microwave oven, where it self-seals during microwave heating to encompass all or a portion of the food item.

The type of activatable adhesive, the amount applied to the microwave sheet, and the coverage and positioning thereon may vary for a given application. Thus, the present invention contemplates numerous arrangements and configurations of the activatable adhesive on the microwave sheet as needed or desired. Where a stronger bond is desired, a particular adhesive may be selected and positioned accordingly. For a weaker bond, another particular adhesive may be selected and positioned accordingly. One example of an activatable adhesive that may be suitable for use with the present invention is amorphous polyethylene terephthalate ("APET"). For example, an APET layer may be co-extruded with a clear polyethylene terephthalate ("PET"). In one variation, the sheet or material includes a layer of DuPont Mylar™ 850 PET with a heat-sealable APET layer. However, other activatable adhesives are contemplated by the present invention.

In one aspect, the activatable adhesive is not tacky or sticky before exposure to microwave energy or heat, making the sheet easier to handle. Alternatively, the adhesive may be somewhat tacky or sticky so that the user substantially can wrap the food item prior to exposure to microwave energy. Depending on the activatable adhesive employed and/or the amount of heat generated during cooking, some implementations of the invention may employ a susceptor layer under or adjacent the activatable adhesive to concentrate more heat in the area of the activatable adhesive and optimize bonding conditions.

In one aspect, a sheet or package arrangement with an activatable adhesive may include an insulating microwave material. For example, according to one aspect of the present invention, the self-sealing package includes an insulating material having expandable closed cells. Upon exposure to microwave energy, the cells expand to form inflated cells. While not wishing to be bound by theory, it is believed that the inflated cells enhance the cooking efficiency of a microwave oven by reducing heat loss to the environment surrounding the package. For example, a microwave package, tray, or the like with insulating cells arranged between the food item and the glass tray in most microwave ovens is believed to reduce heat transfer between the food and the tray, allowing the food to heat more efficiently. Additionally, after cooking, a package with inflated cells may be comfortable to the touch, thereby allowing a user to comfortably grasp the package and remove it from the microwave oven. Optionally, the sheet is provided with a susceptor material. In one aspect, the susceptor material is positioned so that when the cells expand, the susceptor is are pressed against the food item in the package to enhance the heating, browning, and/or crisping thereof.

Figure 4:
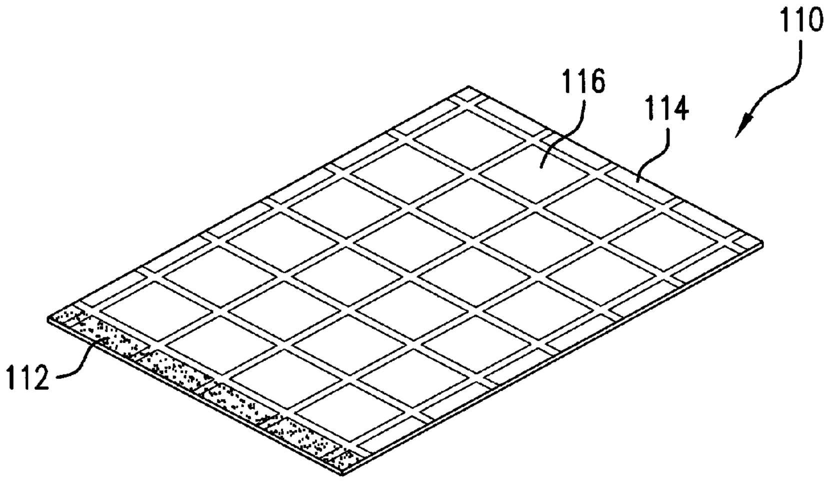
FIG. 4 is a perspective view of a sheet of microwave material having an activatable adhesive portion in accordance with the present invention.

FIG. 4 is a perspective view of an exemplary microwave sheet 110 employing and defining an activatable adhesive region 112 on an insulating microwave material 114 according to the present invention. The shape and size of the sheet 110 and the location, size, and shape of the activatable adhesive region 112 may vary depending on the numerous factors, such as the shape and size of the food item (best seen in FIGS. 5 and 6) intended to be heated with the sheet 110. The microwave sheet 110 defines one or more closed cells 116 that expand when exposed to microwave energy. The sheet 110 is provided in a rectangular shape, but any shape or size may be used as needed or desired. Additionally, the sheet 110 shown has square shaped insulating cells 116, but other shapes are contemplated.

Figure 5:
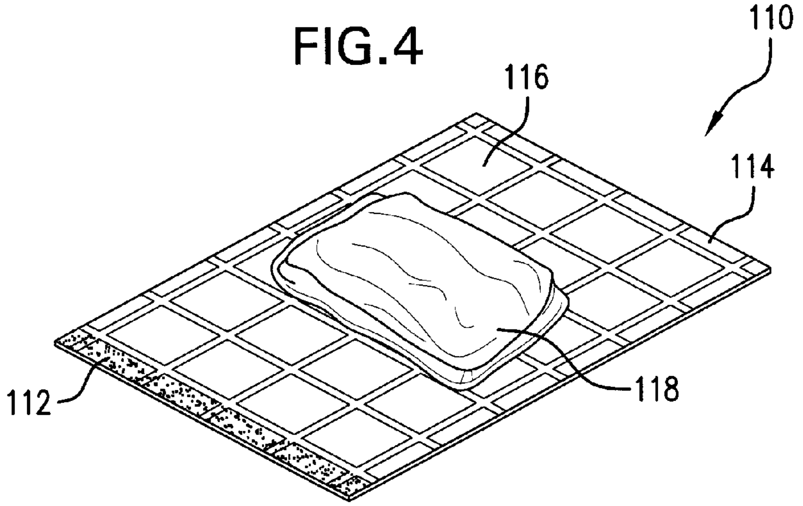
FIG. 5 is a perspective view of the sheet of FIG. 4 with a food item placed thereon.
Figure 6:
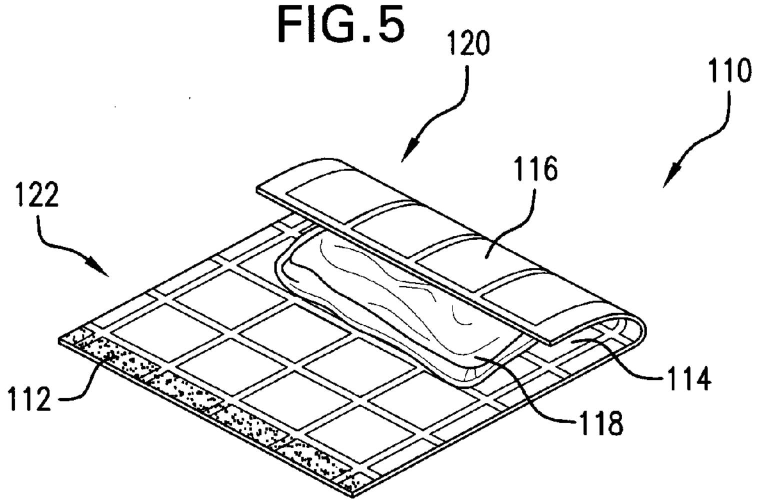
FIG. 6 is a perspective view of the sheet of FIG. 5 with a portion of the sheet folded over the food item.
Figure 7:
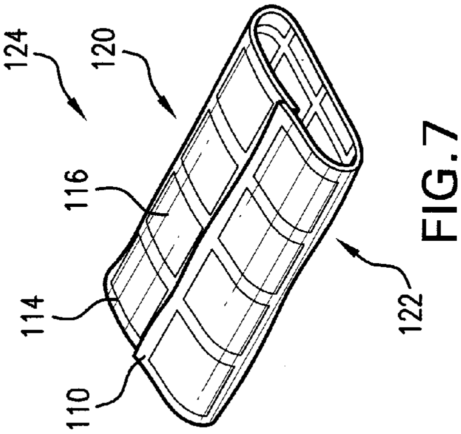
FIG. 7 is a perspective view of the sheet of FIG. 4 with a second portion of the sheet folded over so the first portion of the sheet, thereby forming a sleeve.

Turning to FIG. 5, a food item 118, for example, a burrito, is placed on the sheet 110. As shown in FIGS. 6 and 7, the user may center the food item 118 on the sheet 110, wrap a first portion 120 (without activatable adhesive) of the sheet 110 over the food item 118 (FIG. 6), and then wrap a second portion 122 (with activatable adhesive) over the food item 118 (FIG. 7) so that at least a portion of the activatable adhesive 112 contacts the first portion 120 of the sheet 110. Folded in this manner, the sheet 110 forms a sleeve 124 around the food item 118.

Figure 8:
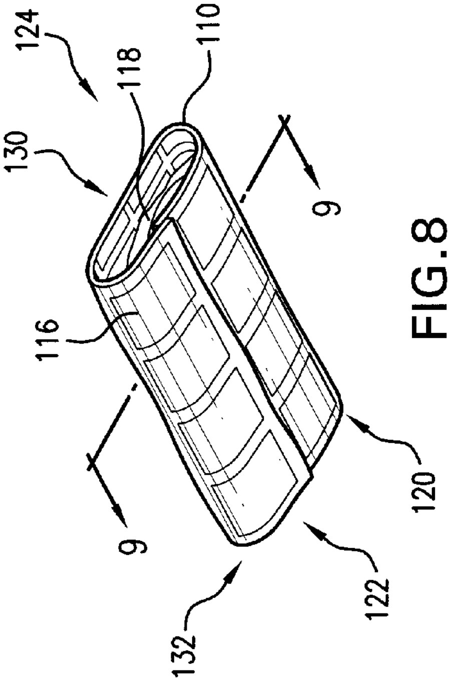
FIG. 8 is another perspective view of the sheet of FIG. 7.
Figure 9:
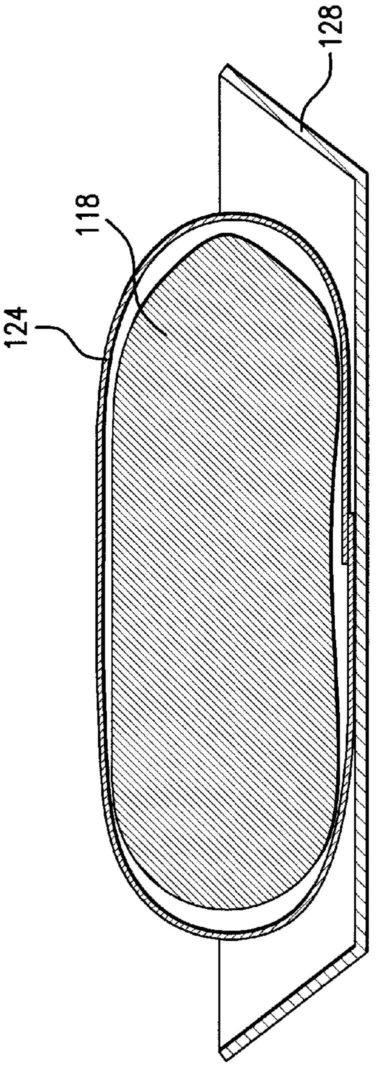
FIG. 9 is a cross-sectional view of the sheet of FIG. 8 taken along a line 9-9.

To assist the bonding and the formation of the sleeve 124, the user may place the overlapping portions 120, 122 of the sheet 110 under the food item 118 in a manner illustrated in FIGS. 8 and 9 so that the wrapped sheet 110 is initially held together by the weight of the food item 118. If desired, the sheet 110 may be provided with a tray 128 in which the wrapped food item 118 is placed for cooking.

The food item 118 wrapped in the sheet 110 then is placed in the microwave oven (not shown) and heated. During microwave heating, the microwave energy and/or the heat associated therewith activates the adhesive, thereby causing the overlapping edges of the sheet to adhere. In this manner, the sheet 110 generally forms a sleeve 124 with two open ends 130, 132 around the food item 118.

Figure 10:
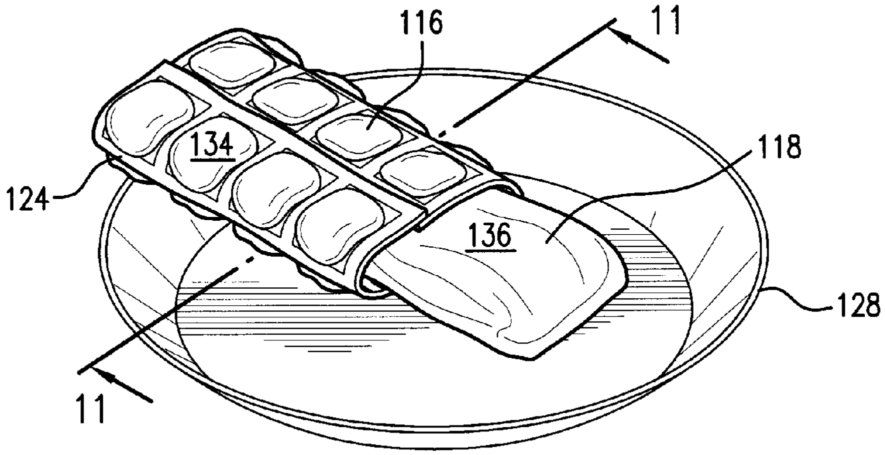
FIG. 10 is a perspective view of the sheet and food item of FIG. 7 after exposure to microwave energy.
Figure 11:
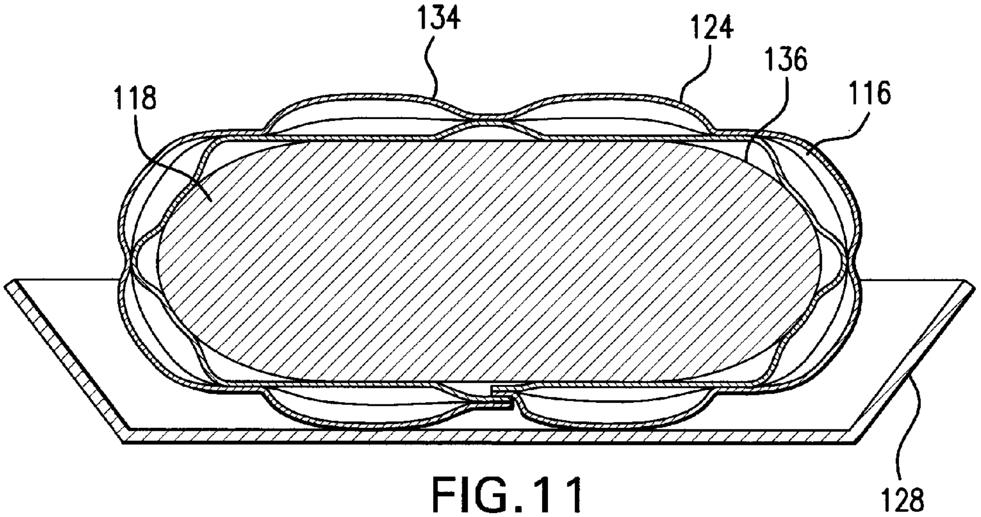
FIG. 11 is a cross-sectional view of the sheet of FIG. 10 taken along a line 11-11.

Additionally, exposure to microwave energy causes the cells 116 to expand, as shown in FIGS. 10 and 11. The expansion of the cells 116 during heating provides an insulating function, as discussed above. The insulation around the food item 118 provides more efficient heating by reducing heat loss to the surrounding microwave environment (e.g., the microwave tray and air). Additionally, the outer surface 134 of the self-formed sleeve 124 may be cooler to the touch than the food item within the sleeve 124. As such, a user may grasp the formed sleeve 124 and remove the food item from the microwave oven. If desired, the user may eat the food item 118 directly from the formed sleeve 124.

Further, where a susceptor material is used, the susceptor material is brought substantially into intimate and/or proximate contact with the food item 118 to brown or crisp the surface 136 thereof. Prior to cooking, some of the sheet 110 may not be in intimate contact with an irregularly shaped food item 118 wrapped therein. As such, only some portions of the food item will be exposed to the susceptor material. The lofting or expansion of the cells 116 of the sheet 110 causes the susceptor layer to bulge against the food item, providing increased contact with the food item 118, and thus more efficient heating, browning, and/or crisping thereof.

Figure 12:
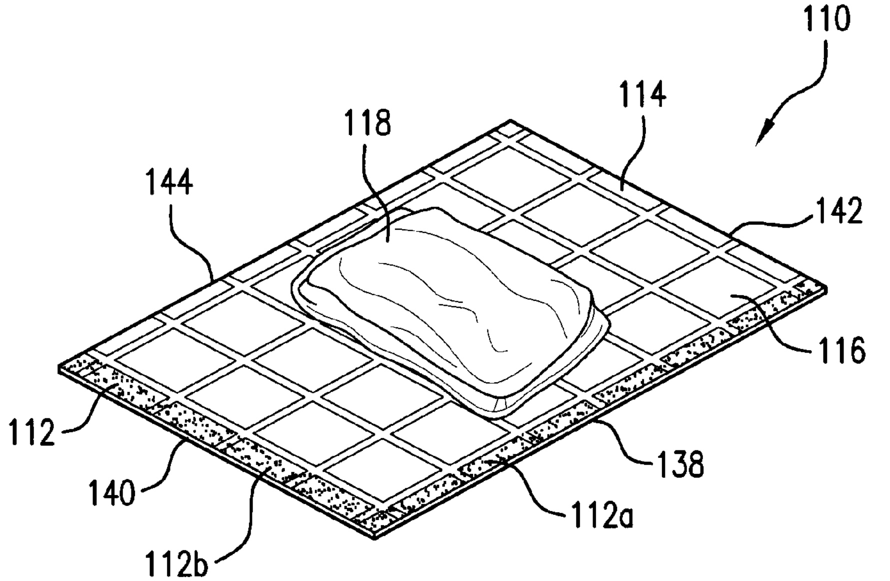
FIG. 12 is a perspective view of a sheet of microwave material including an activatable adhesive portion in accordance with one aspect of the present invention, with a food item placed thereon.
Figure 13:
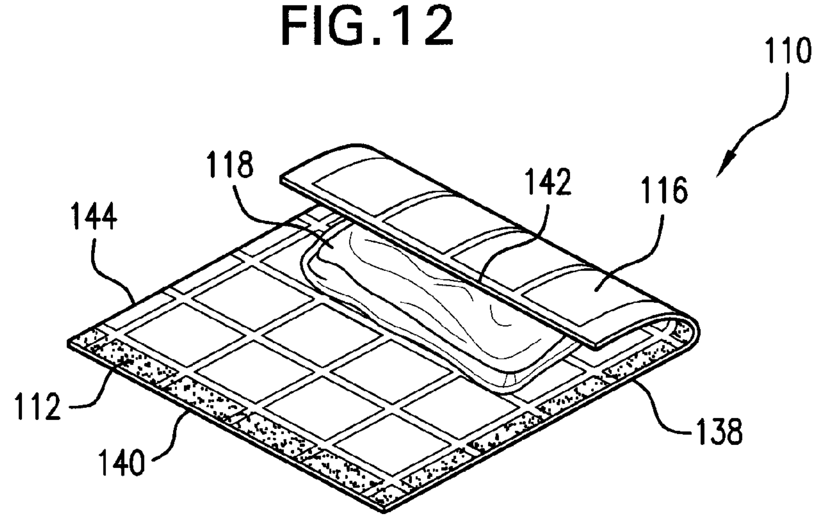
FIG. 13 is a perspective view of the sheet of FIG. 12 with a portion of the sheet folded over the food item.
Figure 14:
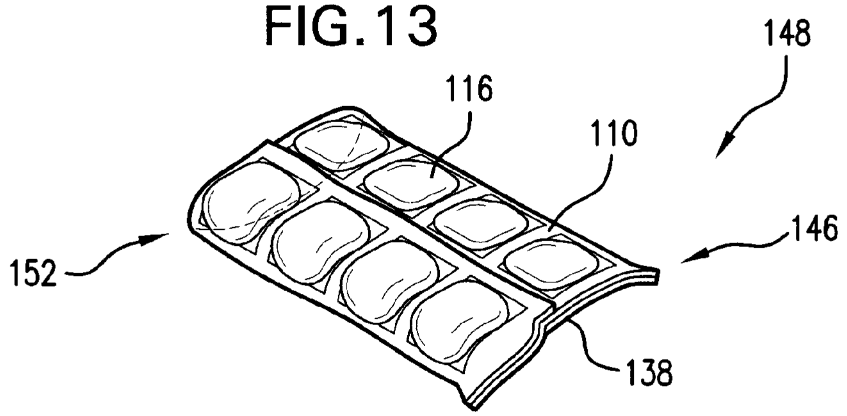
FIG. 14 is a perspective view of the sheet of FIG. 13 with a second portion of the sheet folded over the food item to form a pocket around the food item.

The exemplary sheet 110 depicted in FIGS. 3-11 includes an activatable adhesive 112 that is positioned to facilitate self-formation of a sleeve 124 with two open ends 130, 132. In contrast, FIG. 12 shows another exemplary sheet 110 with insulating material 114 and activatable adhesive 112 provided along two adjacent edges 138, 140 of the sheet 110. In this example, the adhesive 112 is contiguously placed along a back edge 138 and a side edge 140 of the sheet 110. The food item 118 is placed on the sheet 110 between the activatable adhesive regions 112*a* and 112*b*. In FIG. 13, the sheet 110 is wrapped over the food item 118. In this example, a portion of the sheet 110 is folded over the food item so that the side edge 142 without adhesive first is placed over the food item 118. The back edge 138 is partially folded onto itself to engage the back activatable adhesive strip 112*a*. FIG. 14 depicts the sheet 110 with expanded cells 116 completely wrapped around the food item 118 after exposure to microwave energy. The overlapping edges are adhered to form a pocket 148 with one open end 152 (shown in hidden line) and one closed end 146. The self-forming pocket 148 provides the same advantages discussed in connection with FIGS. 3-11 and further prevents excess juices, cheese, sauce, and the like and from dripping, provided that the pocket 148 is held with the open end 152 in a upward position during consumption of the food item 118. The open end 152 also provides ventilation.

Figure 15:
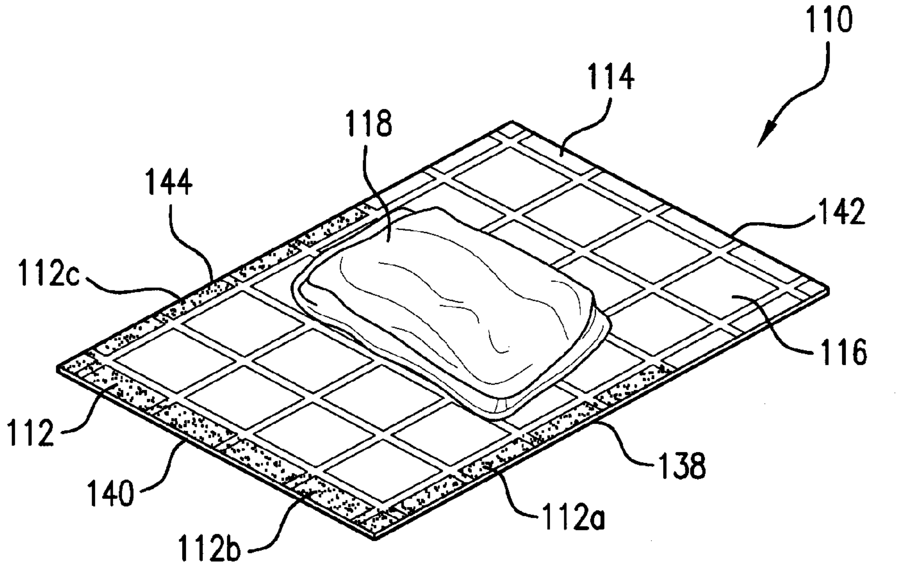
FIG. 15 is a perspective view of a sheet of microwave material including an activatable adhesive in accordance with the present invention, with a food item placed thereon.
Figure 16:
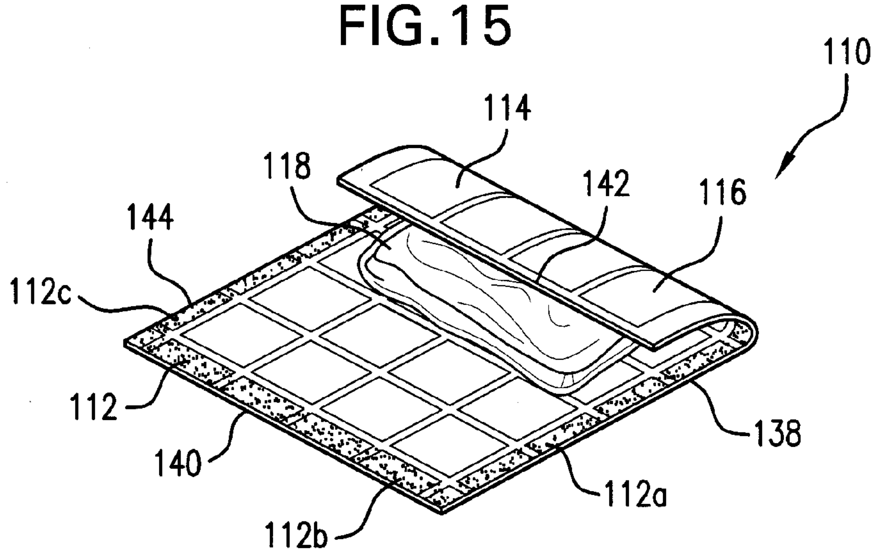
FIG. 16 is a perspective view of the sheet of FIG. 15 with a portion of the sheet folded over the food item.
Figure 17:
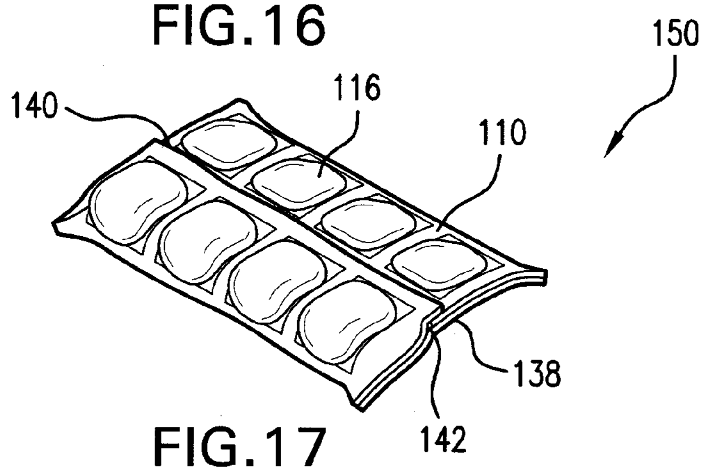
FIG. 17 is a perspective view of the sheet of FIG. 16 with a second portion of the sheet folded over the food item to form a pocket around the food item.

FIGS. 15-17 illustrate a microwave sheet 110 in which the activatable adhesive 112 is provided along at least a portion of three adjacent edges 138, 140, 144 of the sheet 110. In FIG. 15, a sheet 110 employing an insulating microwave material 114 and an adhesive strips 112*a*, 112*b*, and 112*c* along a portion of the back edge 138, a portion of the front edge 144, and one of the side edges 140, is shown. FIG. 16 illustrates the sheet 110 being folded over the food item 118. Folded in this manner, the adhesive 112*b* along the front edge 144 is aligned with itself or a portion of the front edge 144. Further, the adhesive 112*a* along the back edge 138 is also aligned with itself or a portion of the back edge 138. FIG. 15 illustrates the sheet 110 completely folded over the food item 118 and defining a sealed cooking vessel 150. The side edge 140 with adhesive is folded onto the corresponding opposite edge 142. The front edge 144 is bonded to itself and the back edge 138 also is bonded to itself to self form the vessel when exposed to heat or microwave energy. The embodiment of FIG. 17 may be further provided with one or more ventilation apertures, perforations, or holes (not shown) if needed or desired.

While various examples of self-sealing microwave sheets are shown and described herein, it should be understood that other arrangements and configurations are contemplated by the present invention. Thus, a microwave sheet may have a food contacting surface, a non-food contacting surface, or both, that is partially, substantially, or entirely covered by an activatable adhesive, for example, APET. In one aspect, the activatable adhesive, for example, APET, may cover substantially the food-contacting surface of the microwave sheet. In this manner, the food item may be placed on the sheet and the sheet folded over the food item a variety of possible ways to form a sleeve, a pocket, or some other container.

II. Heating and Shipping Microwave Interactive Sheet Employing Variably Sized and Variably Expansive Cells Many food items are irregular in shape and small in size, making them difficult to insert into individual microwave susceptor sleeves for heating, browning, and crisping. Thus, according to another aspect of the present invention, a packaging material and package formed therefrom provides improved contact between the material and multiple food items or a single food item having an irregular shape.

The material and package formed therefrom includes closed expandable cells that expand during exposure to microwave energy to conform to the shape and size of the food item. The cells may include one or more microwave interactive elements or susceptors. The cells expand upon exposure to microwave energy, thereby bringing the susceptor material into closer proximity to the surface of the food item. In one aspect, individual food items are wrapped or packaged in an insulating material, for example, a material having cells of varying sizes and configurations that may expand to differing degrees (termed herein "variably expanding cells" or "variable expanding cells"). The material may be any suitable expandable cell material as desired, and in some instances, may include any of the materials described herein, any of the materials described in International Application Publication No. WO 03/066435A2, published Aug. 14, 2003, which is incorporated by reference herein, or any combination thereof. Optionally, the material may be used to form a package that provides support for and protection of fragile food items during shipping and handling prior to cooking.

The variably expanding cells and the non-uniform arrangements of the same provide several advantages over presently available microwave packaging materials. First, the cells provide insulation along the bottom and periphery of the food item, thereby preventing heat loss to the surrounding environment. Second, multiple cell arrangements may be used to form a sheet for use in a package, so that multiple food items can be cooked in the same package. Third, where a susceptor is included, the size, shape, and level of expansion may be customized to accommodate any food item, thereby providing increased proximity to the susceptor material and improved browning and crisping during microwave heating.

The size, shape, and configuration of the expanding cells may vary for a particular application. The cells may be arranged in any pattern, including rows, concentric circles, arrays of shapes or individual cells, or any other pattern as desired. Likewise, the difference in size between each of the expandable cells may vary for a particular application. In one aspect, one or more cells varies from about 5 to about 15% in expanded volume, as compared with the expanded volume of another cell. In another aspect, one or more cells varies from about 15 to about 25% in expanded volume when compared with the volume of another cell. In another aspect, one or more cells varies from about 25 to about 35%, from about 35 to about 45%, from about 45 to about 55%, from about 55 to about 65%, from about 65 to about 75%, from about 75 to about 85%, from about 85 to about 95%, from about 95 to about 105%, from about 105 to about 110%, from about 110 to about 115%, from about 115 to about 85%, from about 85 to about 100%, from about 100 to about 125%, from about 125 to about 150%, from about 150 to about 175%, from about 175 to about 200%, from about 200 to about 225%, from about 225 to about 250%, from about 250 to about 275%, from about 275 to about 300%, from about 300 to about 325%, from about 325 to about 350%, from about 350 to about 400%, from about 400 to about 450%, from about 450 to about 500%, from about 500 to about 600%, from about 600 to about 700%, from about 700 to about 800%, from about 800 to about 900%, from about 900 to about 1000%, or greater than 1000% in expanded volume, as compared with the expanded volume of another cell.

In another aspect, one or more cells varies from about 5 to about 15% in unexpanded surface area, as compared with the unexpanded surface area of another cell. In another aspect, one or more cells varies from about 15 to about 25% in unexpanded surface area when compared with the unexpanded surface area of another cell. In another aspect, one or more cells varies from about 25 to about 35%, from about 35 to about 45%, from about 45 to about 55%, from about 55 to about 65%, from about 65 to about 75%, from about 75 to about 85%, from about 85 to about 95%, from about 95 to about 105%, from about 105 to about 110%, from about 110 to about 115%, from about 115 to about 85%, from about 85 to about 100%, from about 100 to about 125%, from about 125 to about 150%, from about 150 to about 175%, from about 175 to about 200%, from about 200 to about 225%, from about 225 to about 250%, from about 250 to about 275%, from about 275 to about 300%, from about 300 to about 325%, from about 325 to about 350%, from about 350 to about 400%, from about 400 to about 450%, from about 450 to about 500%, from about 500 to about 600%, from about 600 to about 700%, from about 700 to about 800%, from about 800 to about 900%, from about 900 to about 1000%, or greater than 1000% in unexpanded surface area, as compared with the unexpanded surface area of another cell.

In yet another aspect, cells may be provided around the periphery of the food item so that during microwave heating, the cells expand along the periphery of the food item and brown the sides of the food item. In another aspect, cells are provided beneath the food product and around it. The cells positioned under the food item may expand to one height, and the cells adjacent the perimeter of the food item may expand to a second height that is greater or less than the first height. In still another aspect, the cells may be arranged to form one or more cavities that can contain the individual food items. In this and other aspects, the susceptor material selectively is brought into proximate or intimate contact with the surface of the food item during expansion of the cells, thereby providing the desired degree of browning and crisping.

Additional examples are provided in FIGS. 18-22. For convenience, food items and packages are described herein as having a top, bottom, and sides. In many instances, the top, bottom, and sides of a package or a food item are relative to a surface the food item is placed on and the perspective of the viewer. It should be understood that reference to a top, bottom, or side is not meant to impart any particular limitation on the scope of the invention, but merely provide an easy way to refer to describe the features thereof.

Figure 18:
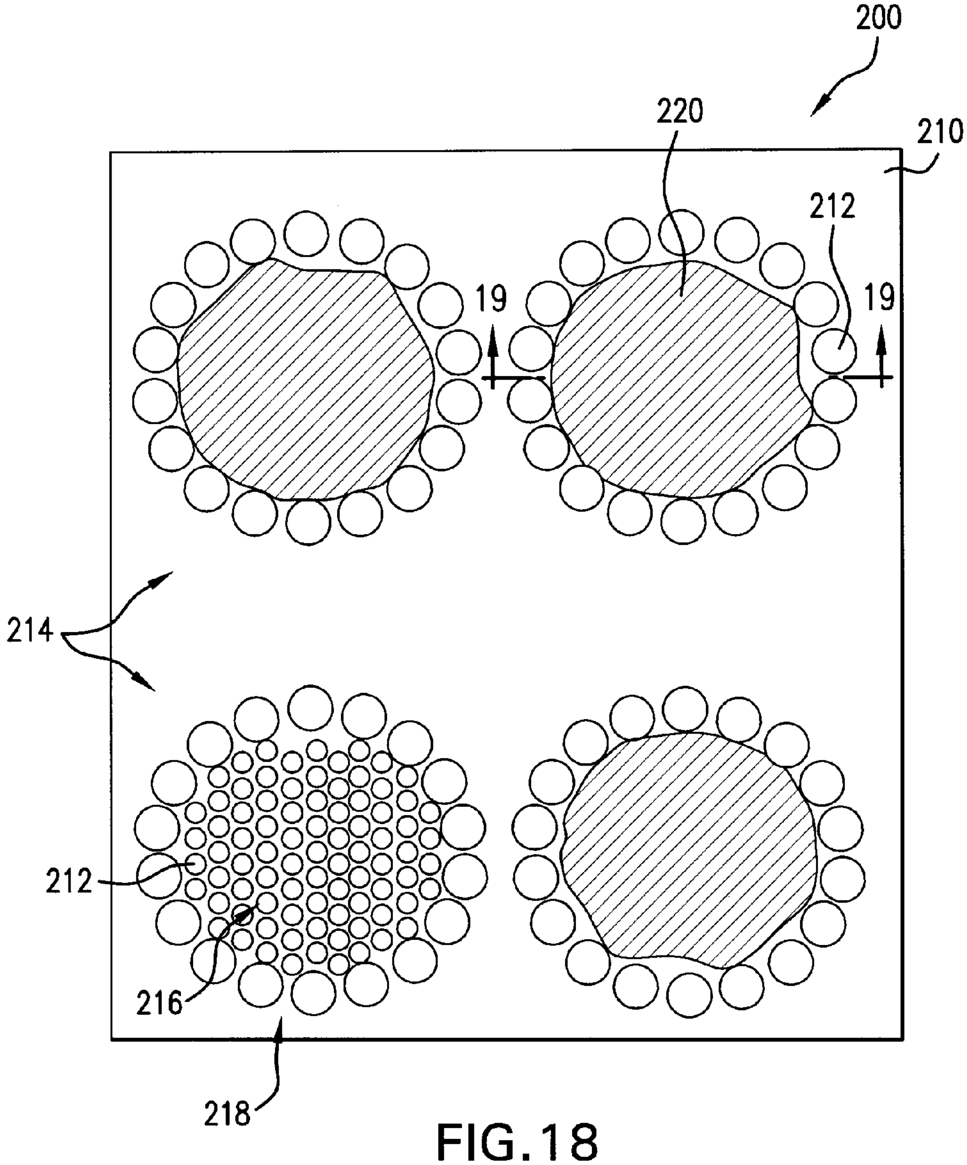
FIG. 18 is a top plan view of a package employing a plurality of variable arranged insulating expanding cell arrangements, in accordance with the present invention.
Figure 19:
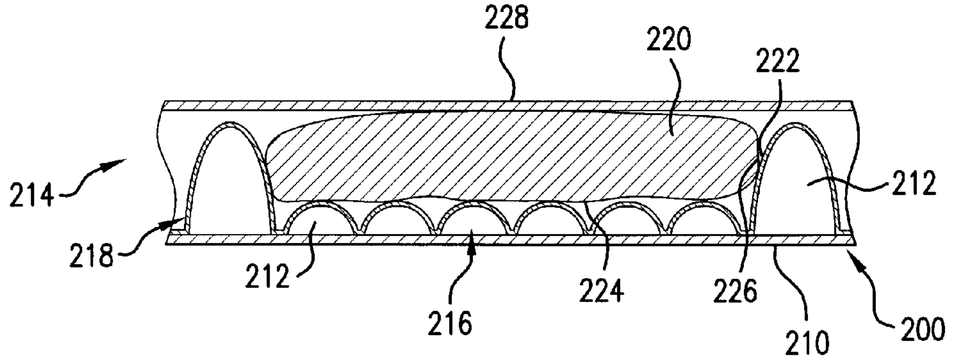
FIG. 19 is a cross-sectional view of the package of FIG. 18 taken along a line 19-19.

Turning to FIGS. 18-19, a sheet 200 of insulating material 210 including variably expanding cells 212 is provided. The sheet 200 defines four arrangements 214 of variably expanding cells 212. The sheet 200 may include the same arrangement of layers as shown in FIGS. 1-3, however, the adhesive pattern defining the expandable cells 212 is not uniform in shape. For each arrangement 214 of variably expansive cells 212, a first set 216 of cells 212 collectively defining a somewhat circular shape is surrounded by a second set 218 of larger cells 212 collectively defining a somewhat ring shape. The cells 212 may be any shape as desired, such as oval, square, or hexagonal.

Each of the four arrangements 214 of cells 212 of FIG. 18 may be used with a food item 220 that is circular, such as a pizza, pot pie, or any food item that is desirably browned and crisped on the bottom and sides thereof. To do so, the food item 220 is placed on the sheet 200 so that the bottom 224 of the food item 220 substantially is centered on the first set 216 of cells 212. The periphery 226 of the food item 220 is then aligned with the inside edge 222 of the second set 218 of cells 212. Four such food items 220 may be placed in each of the four arrangements 214 of variably expansive cells 212 and may, if desired, be used to form a package or other construct. When the sheet 200 or a package employing the sheet 200, is exposed to microwave energy, the first, inner set 216 of cells 212 lofts upward against the bottom 224 of the food item 220. The outer set 218 of cells 212 lofts to a greater extent than the first set 216 of cells 212 against the periphery 226 of the food item 220.

If desired, a package employing the sheet 200 with variable cells 212 includes a paperboard or other type cover 228. The cover 228 may or may not include a microwave interactive material, such as a susceptor or antenna. Further, vertical dividers (not shown) may be provided to maintain appropriate alignment of the food items with the cell arrangements.

In this and other aspects, the sheet may include microwave active elements or susceptors. The susceptors may be flat, continuous, or patterned, and/or deployed in combination with shielding or pseudo-shielding elements, such as thicker aluminum patches. Additionally, individual cells may be provided with patterned microwave interactive functionality or susceptors, which can aid further in providing custom heating, browning, and crisping of the food item. Likewise, the area between the cell arrangements may include one or more of any of such elements as needed or desired for proper heat distribution.

Figure 20:
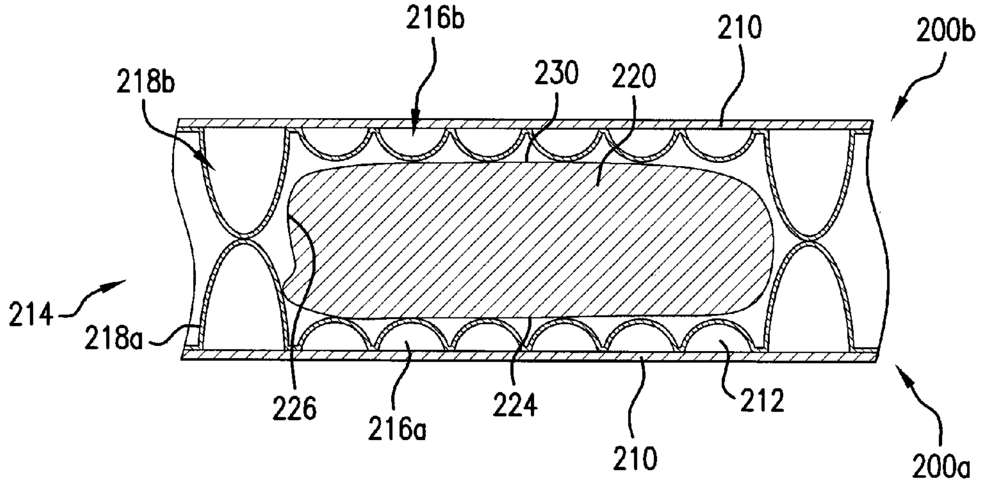
FIG. 20 is a cross-sectional view of a package employing complimentary variably expanding cell arrangements, in accordance with the present invention.

FIG. 20 depicts an exemplary package employing two sheets 200*a*, 200*b* of material 210, each with the same variable cell arrangement 214 as that shown in FIG. 18. The food item 220 is placed on the first sheet 200*a* in the same manner as discussed above with regards to FIGS. 18 and 19. The second sheet 200*b* is placed over the food item 220 so that the generally circular shape of the first set 216*b* of cells 212 is basically centered over the top surface 230 of the food item 220, and the second set 218*b* of cells 212 is arranged adjacent the periphery 226 of the food item 220.

As shown in FIG. 20, upon exposure to microwave energy, the cells 212 on the first sheet 200*a* loft upward in the same manner as discussed above with regard to FIGS. 18 and 19. As such, the first set 216*a* of cells 212 engage the bottom 224 of the food item 220 and the second set 218*a* of cells 212 bulge up against the outer periphery 226 of the food item 220. The expanded cells 212 in the second sheet 200*b* substantially are a mirror image of the first sheet 200*a*, although other configurations are contemplated. The inner set 216*b* of cells 212 expand downward to engage the top surface 230 of the food item 220 while the outer cells 218*b* bulge downward to engage the outer periphery 226 of the food item 220. The two sheets 200*a* and 200*b* thus act in concert to completely or nearly completely surround the food item 220. In this way, all or nearly all sides of the food item 220 are insulated by and in contact with the expanded cells 212. Such a sheet or package may be used where browning of all surfaces of the food item is desirable.

Various package arrangements with variably-sized or variably-expandable cell sheets are contemplated by the present invention. In one aspect, an expandable cell sheet is disposed on the bottom and top panels of a folding carton. In another aspect, an expandable cell sheet is adhered to a pouch or sleeve. Further, a sheet with variable cells may be provided with an activatable adhesive as described herein.

According to another aspect of the present invention, a sheet or package with variable cell arrangements may be used to pack and transport food items. Some food items are quite fragile, especially in the frozen state, and can be damaged by the normal stresses of distribution, shipping, and handling. It is known to provide thermoformed plastic trays with formed compartments to more securely hold the product. These trays are not typically capable, however, of providing susceptor functionality for microwave browning and crisping. Thus, according to this aspect, the sheet or package is exposed to microwave energy to expand the cells and hold the food items in place during shipping. The sheet or package may be exposed with or without the food item or items therein, for a period of from 1 to about 15 seconds, for example, 2 to 10 seconds. In doing so, the cells expand and provide support and protection for the food item or items contained therein.

Figure 21:
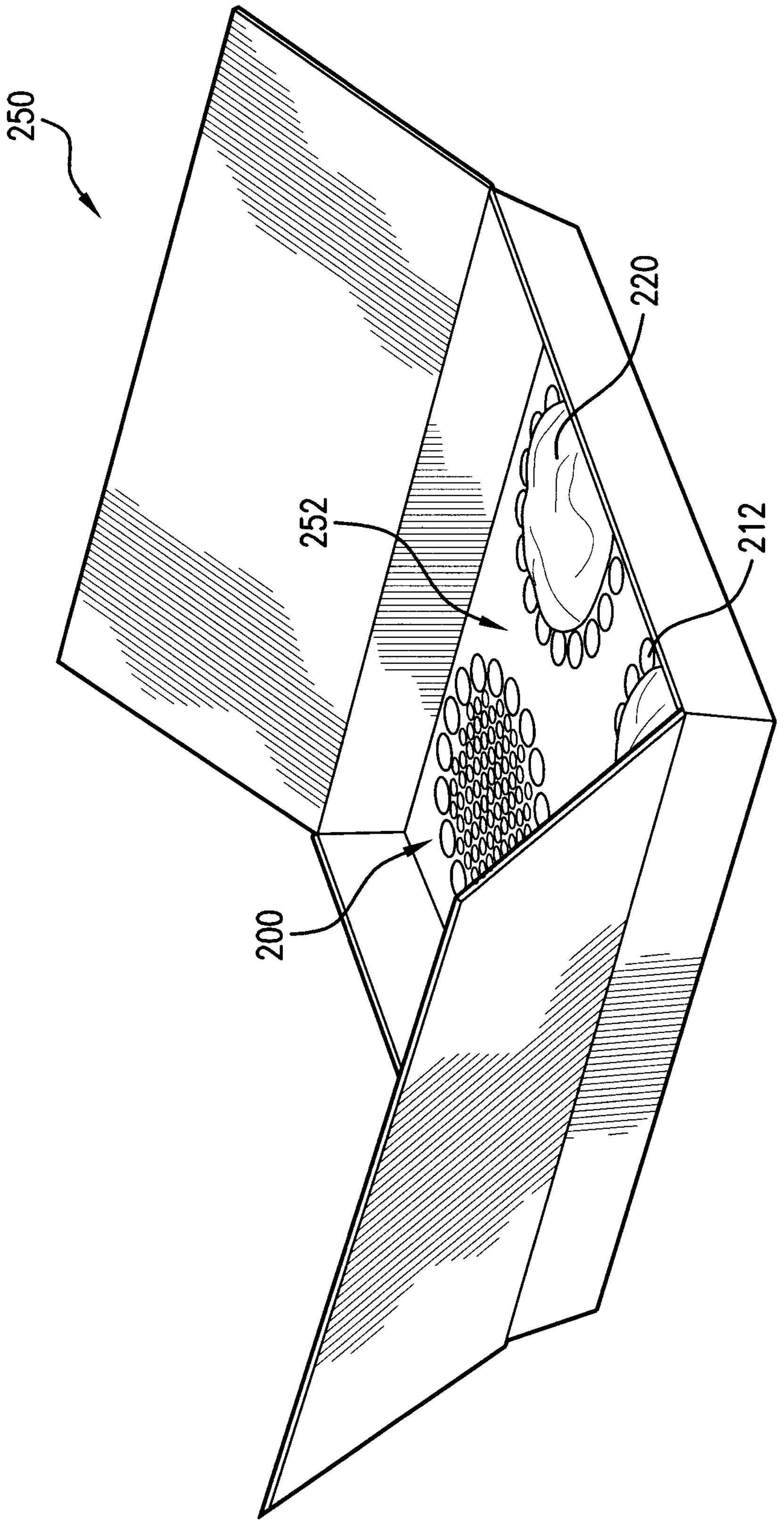
FIG. 21 is a perspective view of the package of FIG. 18.

FIG. 21 illustrates an exemplary shipping and cooking package or carton 250 in accordance with the present invention. The package 250 includes a sheet 200 with variable cells 212 adhered or otherwise inserted to the bottom portion 252 of a package 250. Prior to loading the food items 220, the package 250 including the sheet 200 is exposed briefly to microwave energy, which causes an initial expansion of the variable cells 212. The food item (not shown) then is placed therein as discussed above and the package 250 is closed with the food items (not shown) restrained and protected by the expanded variable cells 212. If desired, the package 250 then may be exposed again to microwave energy to further expand the cells 212 and provide tighter conformance to the shape of the food item (not shown). Alternatively, the food item may be placed in register on an unexpanded sheet or in a package, which then is briefly exposed to microwave energy to partially or completely expand the cells. Following heating by the user, the package 250 is opened and the undamaged and properly cooked individual food items (not shown) are removed.

Figure 22A:
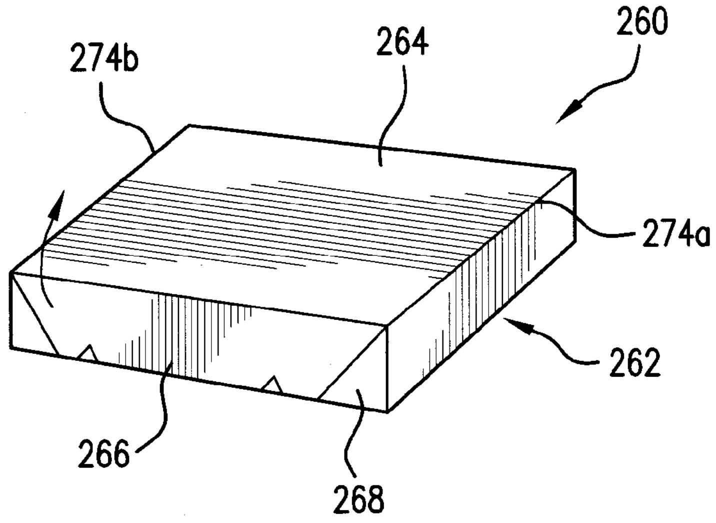
FIG. 22A is a perspective view of a package having an insulating material on at least a portion of the inside thereof, in a closed position.
Figure 22B:
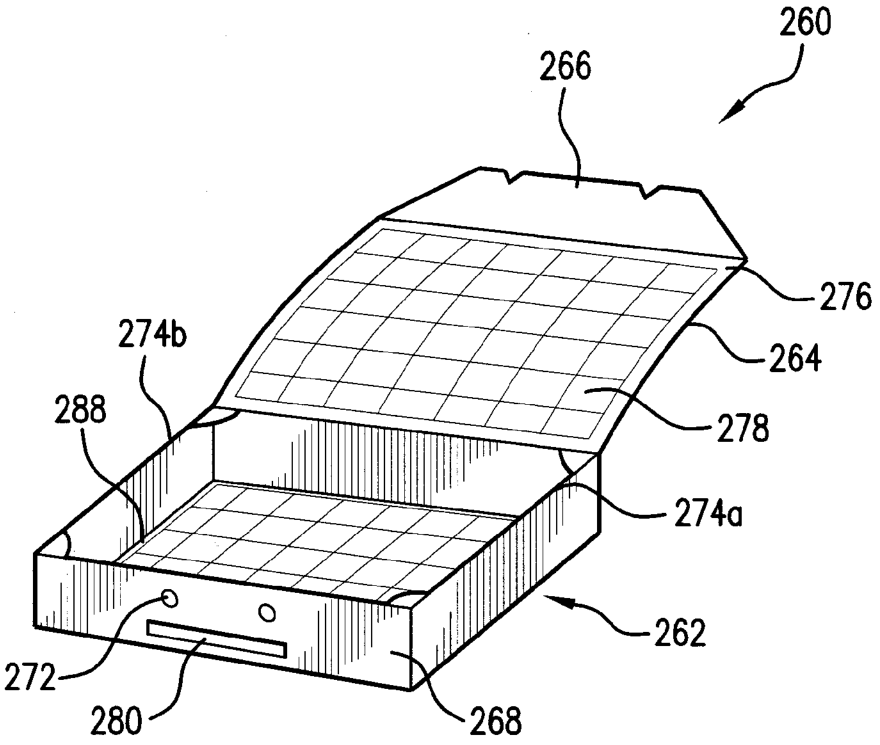
FIG. 22B is a perspective view of a package having an insulating material on at least a portion of the inside thereof, in an open position.

Another exemplary package is provided in FIGS. 22A and 22B. The package 260 includes a tray 262 and a lid 264 including a tab 266. Prior to being opened (FIG. 22A), the lid 264 covers the tray 262 and the food item (not shown) therein, and the tab 266 may be removably sealed to a front panel 268 of the package 260. When the food item (not shown) is ready to be heated, the package 260 is opened by pulling upward on the tab 266. Vent holes 272 or other venting features (not shown) may be provided in the front panel 268 if needed or desired.

If desired, the lid may be pulled back along perforations (not shown) located along or proximate edges 274*a* and 274*b*. The interior surface 276 of the lid 264 may include an insulating material 278, with or without a susceptor layer, such as those described herein. The insulating material 278 may include an oxygen barrier layer, variably sized and/or variably expanding cells, partially expanded cells, or numerous other features disclosed herein or contemplated hereby. To re-close the package 260 after being opened, the tab 266 may engage a corresponding slot 280 to secure the lid 264 in position. However, other means of securing the tab 266 are contemplated hereby.

If desired, additional insulating material 278 may be provided on one or more interior surfaces of the package, for example, on the bottom interior surface 288 to enhance heating, browning, and crisping of the food product, or to provide further insulation between the food item and the bottom of the tray and the floor of the microwave oven.

A package in accordance with this aspect of the present invention may be suitable for the packaging, transportation, and cooking of numerous types of food items. For example, the package may be used for irregularly shaped items, such as French fries, and may incorporate other features disclosed herein, such as variably expanding cells, such as those discussed above, and pre-expanded cells, such as those discussed below.

III. Insulating Tray with Self-Forming Walls

According to another aspect of the present invention, a microwave tray is provided. The tray is flat initially, but upon exposure to microwave energy, one or more flaps or edges of the tray fold upward to form flaps substantially perpendicular to the tray. The flaps serve to strengthen and support the tray. Moreover, if combined with microwave active elements, the flaps may improve browning and crisping of the sides of a food item in the tray.

Figure 23:
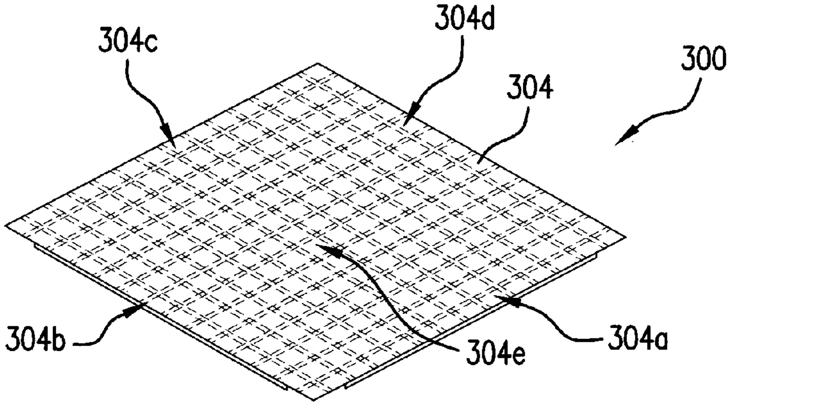
FIG. 23 is a perspective view of an exemplary microwave tray having four self-forming walls in the non-folded position.
Figure 24:
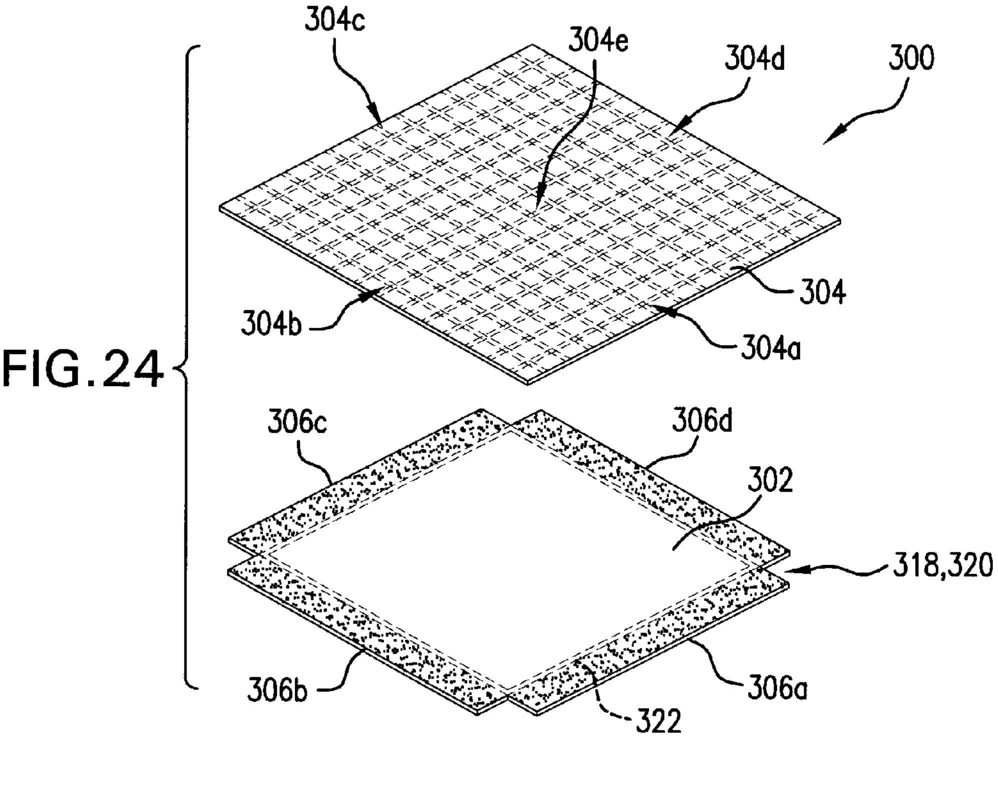
FIG. 24 is an exploded view of the tray of FIG. 23.

FIGS. 23 and 24 depict an exemplary microwave tray 300 according to the present invention. The tray 300 includes a support 302 formed from paperboard, or other suitable material, having at least one layer of insulating material 304 partially adhered or affixed thereto. The insulating material 304 is positioned so that the susceptor film faces the food product (not shown) to be heated thereon. The tray 300 includes four self-forming flaps 306*a*, 306*b*, 306*c*, and 306*d* in the non-folded position. The flaps 306*a*, 306*b*, 306*c*, and 306*d* may be integral with the support 302 or may be adhered or joined thereto. The flaps 306*a*, 306*b*, 306*c*, and 306*d* may be defined by a cutout 318 in one or more corners 320 of the support 302. In one aspect, the insulating material 304*a*, 304*b*, 304*c*, and 304*d* aligned with the flaps 306*a*, 306*b*, 306*c*, and 306*d* is adhered thereto, and the remaining insulating material 304*e* is disposed on, but not adhered or otherwise affixed to the support 302.

Figure 25:
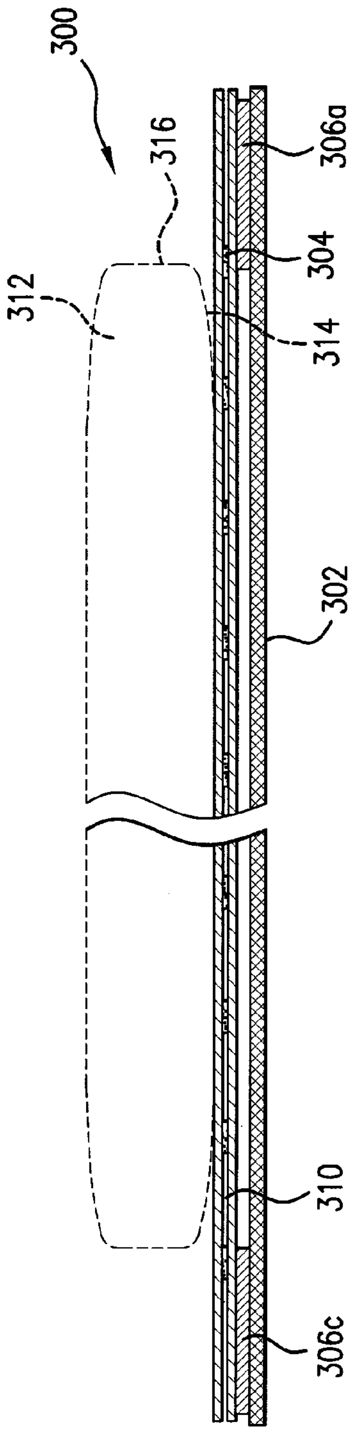
FIG. 25 is a cross-sectional view of the tray of FIG. 23 before exposure to microwave energy.
Figure 26:
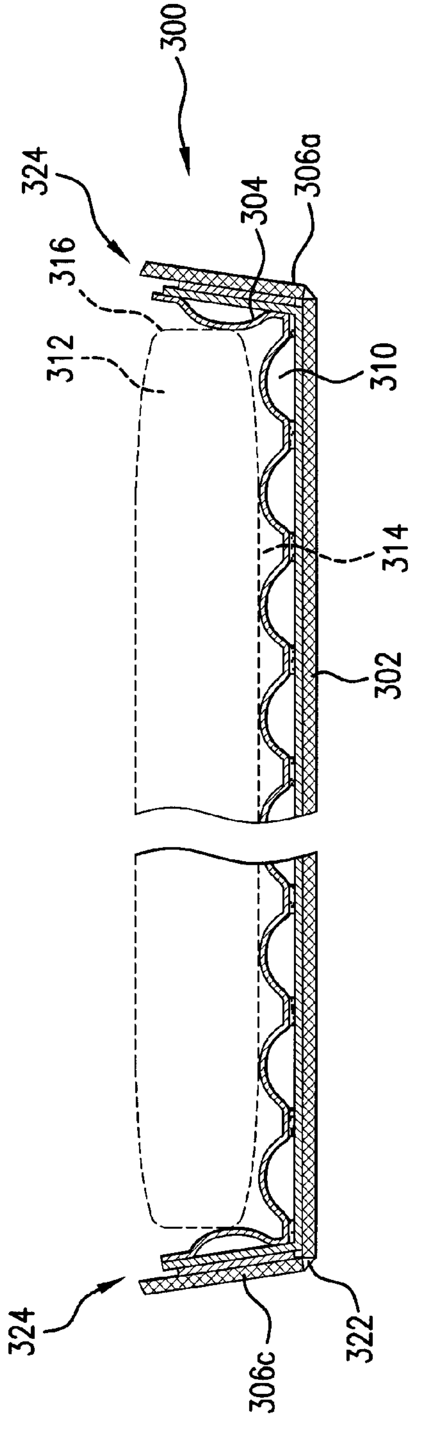
FIG. 26 is a cross-sectional view of the tray of FIG. 23 after exposure to microwave energy.

FIG. 25 depicts the tray 300 of FIG. 23 with a food item 312 placed thereon. Upon exposure to microwave energy, the insulating cells 310 expand, thereby contracting the overall surface area of the insulating material 304. Since the insulating material 304 is adhered to only the flaps 306*a*, 306*b*, 306*c*, and 306*d* of the tray 300, the contraction of the insulating material 304 draws the flaps 306*a*, 306*b* (not shown), 306*c*, and 306*d* (not shown) toward the food item 312, as shown in FIG. 26. In this manner, the tray 300 features self-forming walls 324 upon exposure to microwave energy. The expanded cells 310 insulate the food item 312 from the microwave environment and, if used with a susceptor layer, brown and crisp the bottom 314 and sides 316 of the food item 312.

To facilitate bending of the flaps 306*a*, 306*b*, 306*c*, and 306*d*, it is also possible to provide a score line 322, depression, or perforation at the desired fold line. The walls 324 substantially are transverse to the support 302, and serve to stiffen the tray 300 and minimize flexing thereof. Thus, upon removal of the tray 300 from the microwave oven, the food item is less likely to spill or fall from the tray 300.

Figure 27:
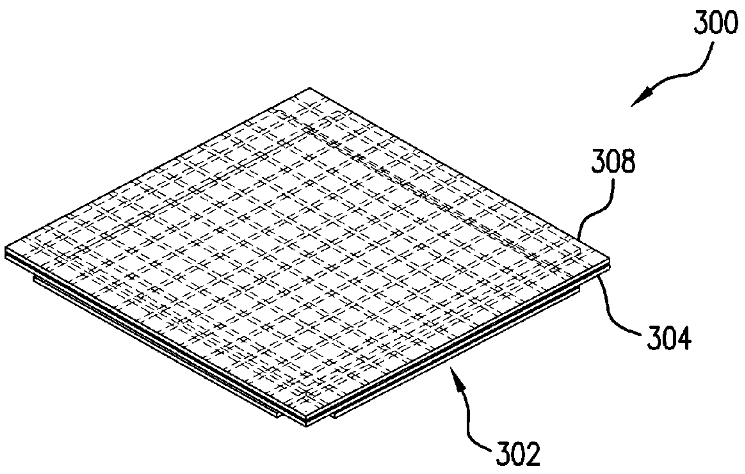
FIG. 27 is a perspective view of an alternative microwave tray structure defining four self-forming flaps in the non-folded position.
Figure 28:
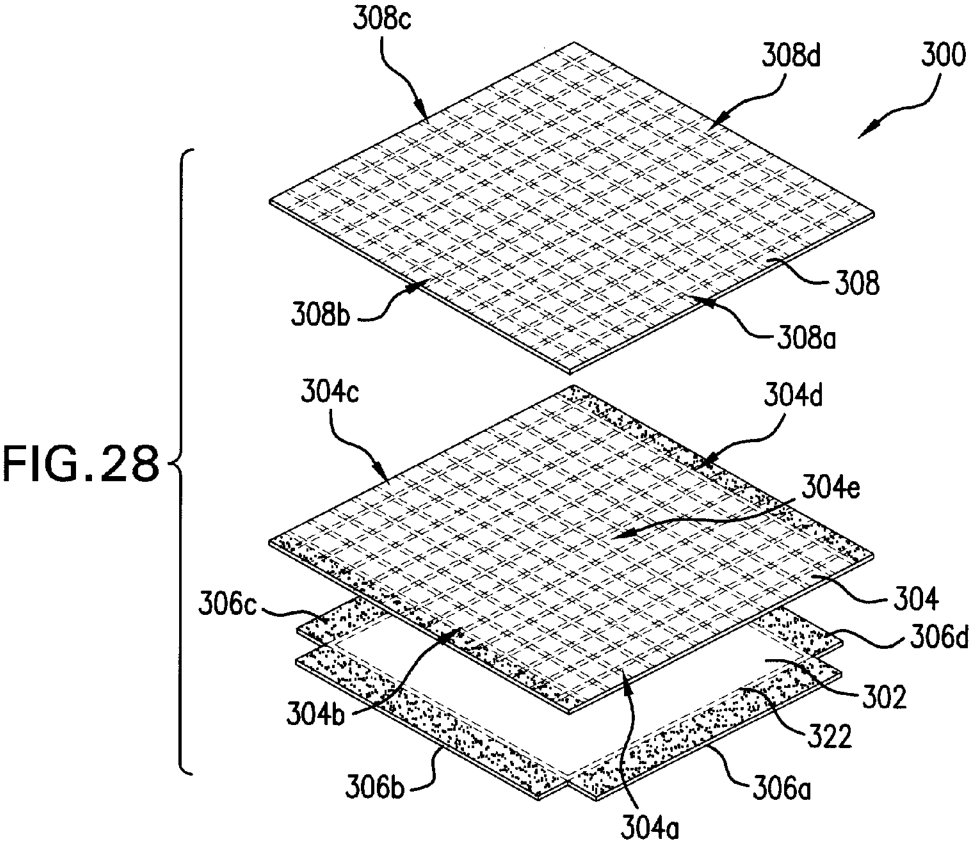
FIG. 28 is an exploded view of the tray of FIG. 27.

FIGS. 27 and 28 depict another exemplary tray 300 according to the present invention. The tray 300 includes a support 302 formed from paperboard, or other suitable material, having a first layer of insulating material 304 partially adhered or affixed thereto, and a second layer of insulating material 308 partially adhered or affixed to the first layer of insulating material 304. The insulating material 308 is positioned so that the susceptor film faces the food product (not shown) to be heated thereon. The tray 300 includes four self-forming flaps 306*a*, 306*b*, 306*c*, and 306*d* in the non-folded position. The flaps 306*a*, 306*b*, 306*c*, and 306*d* may be integral with the support 302 or may be adhered or joined thereto. In one aspect, the insulating material 304*a*, 304*b*, 304*c*, and 304*d* aligned with the flaps 306*a*, 306*b*, 306*c*, and 306*d* is adhered thereto, and the remaining insulating material 304*e* is disposed on, but not adhered or otherwise affixed to the support 302. Likewise, the insulating material 308*a*, 308*b*, 308*c*, and 308*d* aligned with the flaps 306*a*, 306*b*, 306*c*, and 306*d* is adhered to the corresponding portions 304*a*, 304*b*, 304*c*, and 304*d* of first layer of insulating material 304, but is not adhered or otherwise affixed thereto.

Figure 29:
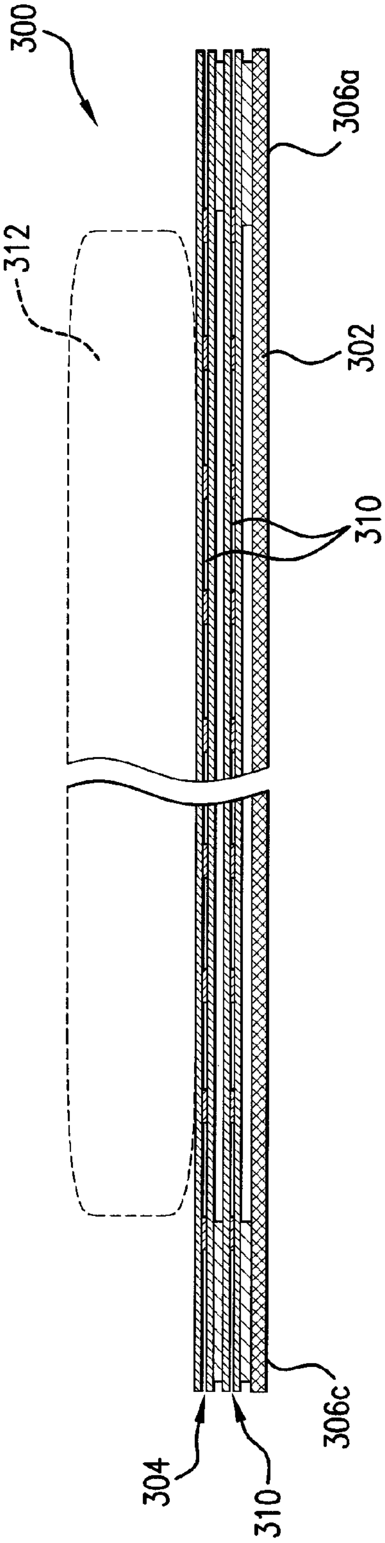
FIG. 29 is a cross-sectional view of the tray of FIG. 27 before exposure to microwave energy.
Figure 30:
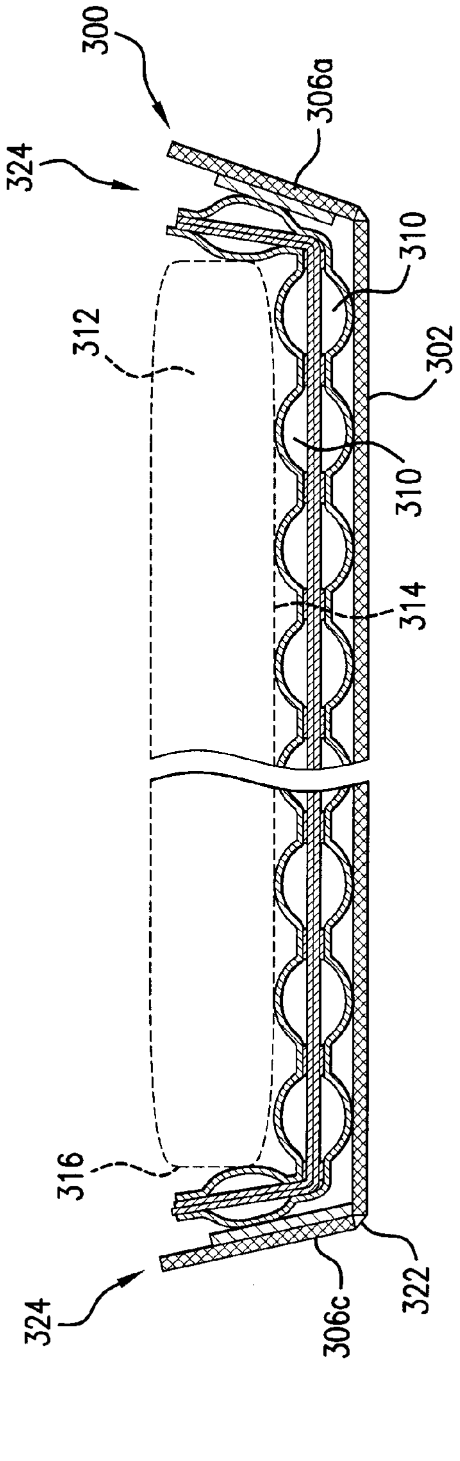
FIG. 30 is a cross-sectional view of the sheet of FIG. 27 after exposure to microwave energy.

FIG. 29 depicts the tray 300 of FIG. 27 with a food item 312 placed thereon. Upon exposure to microwave energy, the insulating cells 310 expand, thereby contracting the overall surface area of the insulating material 304. Since the insulating material 304 and 308 is adhered to only the flaps 306*a*, 306*b*, 306*c*, and 306*d* of the tray 300, the contraction of the insulating material 304 and 308 draws the flaps 306*a*, 306*b* (not shown), 306*c*, and 306*d* (not shown) toward the food item 312, as shown in FIG. 30. In this manner, the tray 300 features self-forming walls 324 upon exposure to microwave energy. The expanded cells 310 insulate the food item 312 from the microwave environment and, if used with a susceptor layer, brown and crisp the bottom 314 and sides 316 of the food item 312.

As discussed above, to facilitate bending of the flaps 306*a*, 306*b*, 306*c*, and 306*d*, it is also possible to provide a score line 322, depression, or perforation at the desired fold line. The walls 324 substantially are transverse to the support 302, and serve to stiffen the tray 300 and minimize flexing thereof. Thus, upon removal of the tray 300 from the microwave oven, the food item is less likely to spill or fall from the tray 300.

IV. Insulating Microwave Material with Oxygen Barrier

According to another aspect of the present invention, a microwaveable material with an oxygen barrier and a package formed therefrom is provided. Such a material or package may lengthen the shelf life of a food item placed in the packaging. Moreover, the package may be used to contain and transport a food item. Numerous materials and packages having various layers and shapes are contemplated hereby.

Any suitable oxygen barrier material may be used in accordance with the present invention. Examples of materials that may be suitable include, but are not limited to, polyvinylidene chloride (PVdC), ethylene vinyl alcohol (EVOH), and DuPont DARTEK™ nylon 66 film may be applied in various manners including the various configurations discussed with regard to PVdC and EVOH. DuPont Dartek™ nylon 66 has a high melting point and good oxygen barrier properties.

The oxygen barrier material may be incorporated into any suitable insulating material including, but not limited to, those described herein. Typically, the insulating material has several layers. For example, the microwave insulating material may include an outer PET layer coated or otherwise provided with a metal layer (such as aluminum), and a paper or paperboard layer adhered to the PET layer, such that the metal layer is disposed between the PET layer and the paper layer. Typically, the food item is placed on the material adjacent the outer PET layer. The insulating material includes expandable cells defined by an arrangement or pattern of adhesive, such as in a grid pattern, between the paper layer and a second PET layer. As discussed in detail above, the cells expand upon exposure to microwave energy to provide an insulating feature and bring the susceptor in proximity to the food item.

The oxygen barrier material may be incorporated at any of numerous possible locations between layers of material.

Figure 31:
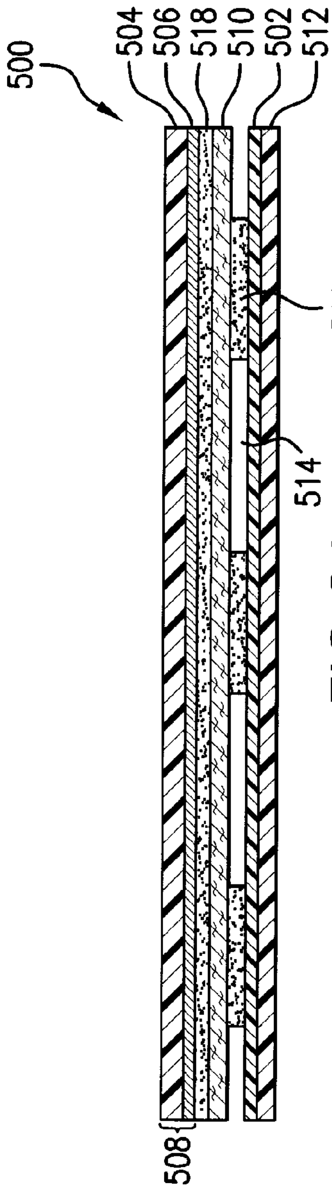
FIG. 31 is a cross-sectional view of an exemplary insulating microwave material with an oxygen barrier, in accordance with the present invention.
Figure 32:
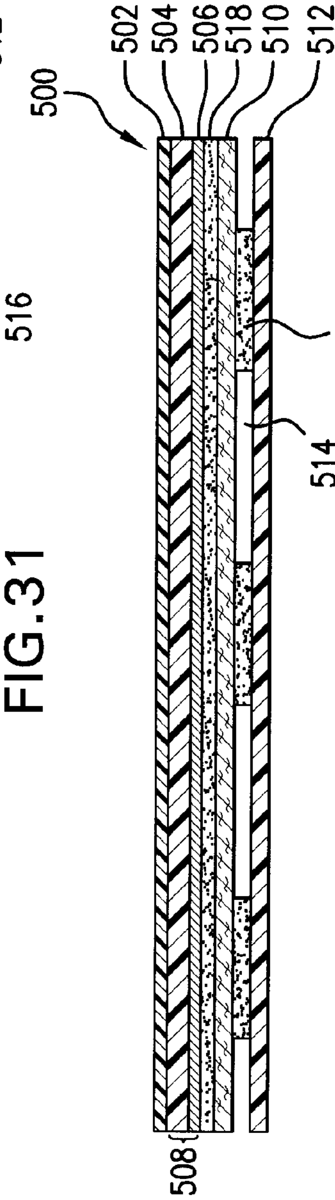
FIG. 32 is a cross-sectional view of another exemplary insulating microwave material with an oxygen barrier, in accordance with the present invention.
Figure 33:
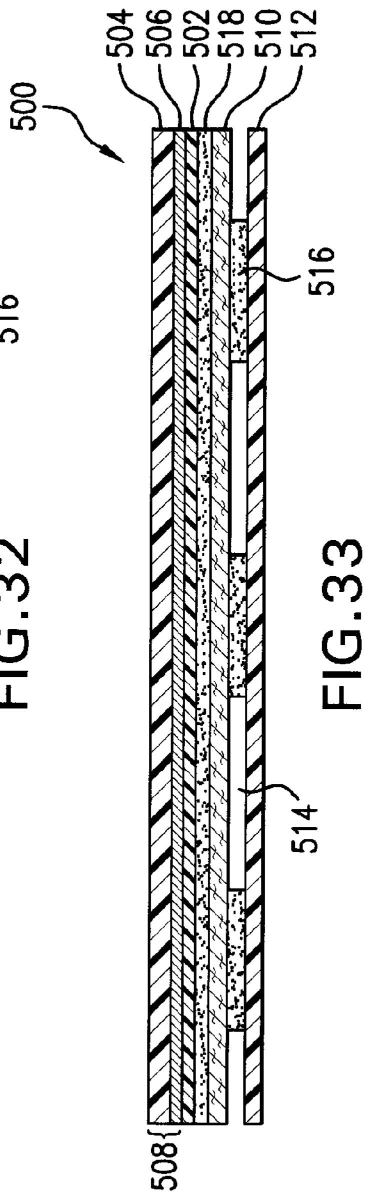
FIG. 33 is a cross-sectional view of yet another exemplary insulating microwave material with an oxygen barrier, in accordance with the present invention.

FIGS. 31-33 illustrate various exemplary arrangements of an insulating material 500 with an oxygen barrier 502. The exemplary insulating microwave material 500 includes a first PET layer 504 and a metal layer 506, which together define a susceptor layer 508. The susceptor layer 508 is adhered or affixed to a paper or paperboard layer 510 using an adhesive 518 or otherwise. The paper layer 510 is adhered in a pattern using an adhesive 516, or otherwise bonded, to a second PET layer 512, thereby defining closed expandable cells 514. In FIG. 31, an oxygen barrier layer 502 is applied between the paper layer 510 and the second PET layer 512. In FIG. 32, an oxygen barrier layer 502 is provided over the first PET layer 504. In FIG. 33, an oxygen barrier layer 502 is positioned between the first PET layer 504 and the paper layer 510. In another aspect (not shown), the oxygen barrier layer 502 may be provided on either or both sides of the paper layer 510. While various possible configurations are shown and described herein, it should be understood that other possible configurations and arrangements of layers are contemplated by the present invention.

An insulating microwave material with an oxygen barrier may be provided in a sealable package or construct. In such an exemplary construct, after the food item is inserted into the package, the package may be flushed with a gas or gas mixture, such as nitrogen and carbon dioxide, to displace the oxygen in the package, and sealed hermetically. The oxygen barrier helps to retard or eliminate the reentry of oxygen into the package. Such a package may help to reduce oxidation of and aerobic bacteria growth on a food item contained therein, and thus may reduce spoilage.

V. Formation of Insulating Microwave Structure Using a Thermo-mechanical Device

Various aspects of the present invention disclosed herein or contemplated hereby involve use of an insulating material having expandable closed cells. According to another aspect of the present invention, the closed cells of the insulating material are formed by thermo-mechanically bonding one or more layers of the insulating material.

The thermo-mechanical bonds may be formed using a thermo-mechanical device, an impulse sealer, ultrasonic bonding device, heat bar, or any similar device, or any combination thereof configured in the desired cell pattern. Typically, an impulse sealer includes a nichrome wire or bend that is pulsed electrically to form a seal. An ultrasonic bonding device uses high frequency vibration, typically in the ultrasonic region, to create a thermo-mechanical bond. In one aspect, the bonding device is pressed against or deployed adjacent to an arrangement of material layers to form a pattern of bonding between portions of the layers. The pattern of bonding defines a plurality of closed cells that expand when exposed to microwave energy, the heat generated thereby, and/or expansion of gases in the cells brought on by exposure to microwave energy.

Figure 34:
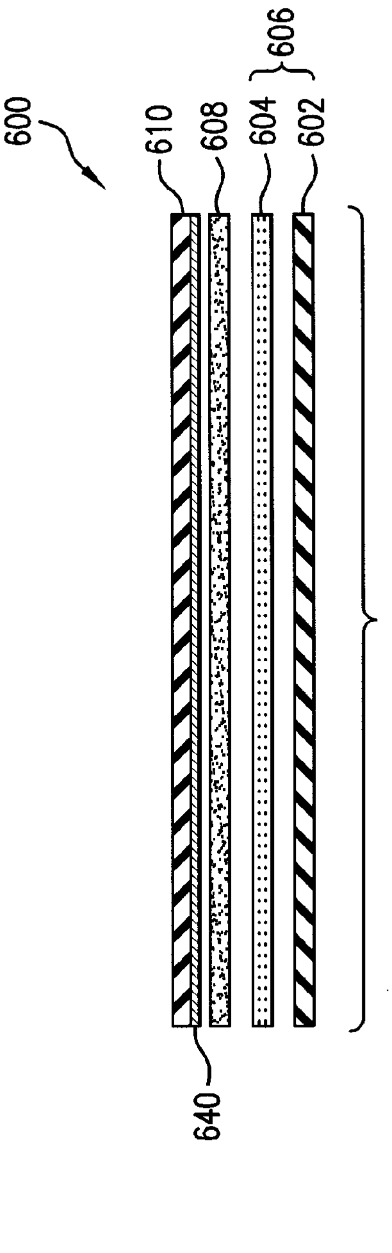
FIG. 34 is a cross-sectional view of the layers used to form an exemplary insulating microwave material.

FIG. 34 depicts the layers of an exemplary insulating material 600. In this example, the first layer 602 is a PET film and the second layer 604 is metal, together defining a susceptor 606. The third layer 608 is paper or paperboard, which may be adhered or affixed to the susceptor using adhesive or otherwise. One example of a paper that may be suitable is a dimensionally stable lightweight paper with some flexibility, such as paper with a basis weight of about 40 lb/ream. The fourth layer 610 is PET clear film with a heat-sealable amorphous PET (APET) coating 640 on one side, adjacent the paper layer 608.

Figure 35:
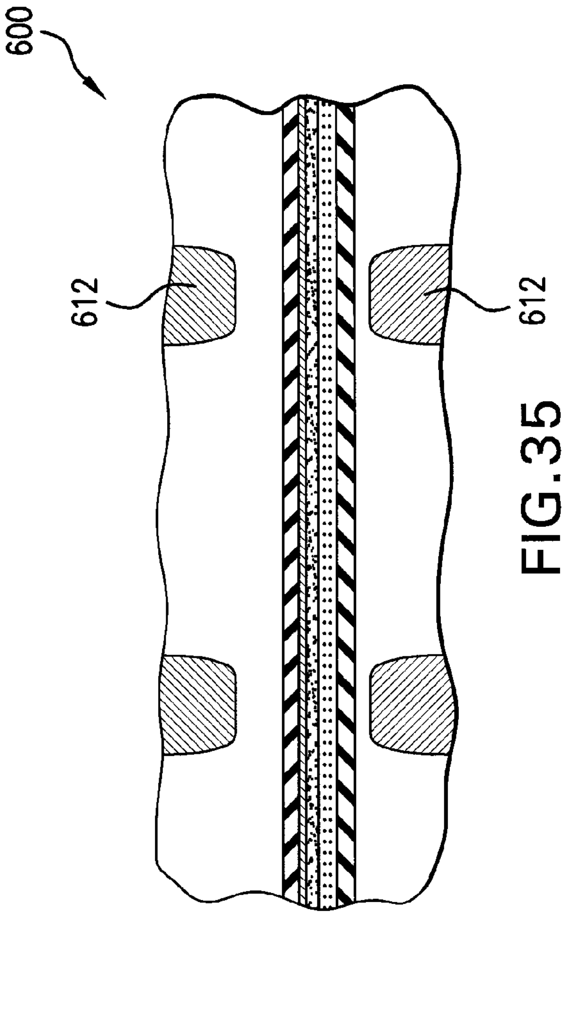
FIG. 35 is a cross-sectional view of the layers of FIG. 34 with a plurality of thermo-mechanical devices arranged to define a pattern of bonds between the layers.
Figure 36:
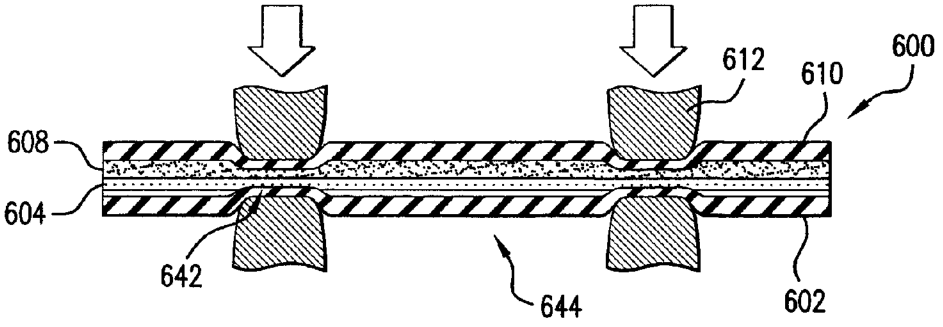
FIG. 36 is a cross-sectional view of the material and devices of FIG. 35, with the thermo-mechanical devices pressed into the layers to define closed cells.
Figure 37:
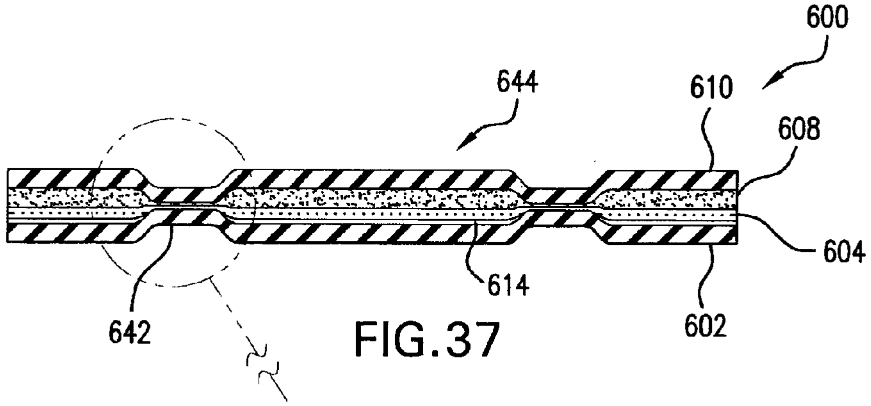
FIG. 37 is a cross-sectional view of an insulating microwave material after processing with a thermo-mechanical device.
Figure 38:
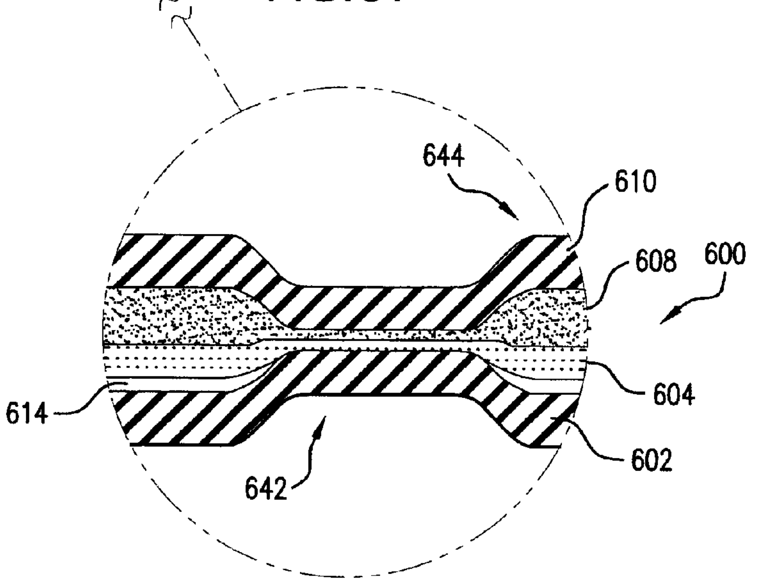
FIG. 38 is a detail of a section of FIG. 37 illustrating a bond between layers.

FIG. 35 depicts the material of FIG. 34 with a plurality of bonding elements 612. As used herein, the term "bonding elements" includes thermo-mechanical devices, impulse sealers, ultrasonic or sonic bonding elements, heated bars, or the like, that are capable of forming thermo-mechanical bonds between layers of PET susceptor film, clear film, and paper, or other layers of insulating microwave material. Turning to FIG. 36, the bonding elements 612 are depressed into the layers of material 600. Where the bonding elements 612 contact the layers, a bond or seal 642 is formed by softening the APET between the layers of material. In the areas not bonded 644, the layers of material define an open space 614 between the paper layer 608 and the PET clear film layer 610, as shown in FIGS. 37 and 38. Thus, in this aspect, closed cells are formed by selectively sealing the perimeter of the cells, rather than by applying an adhesive in a pattern, as discussed above.

Figure 39:
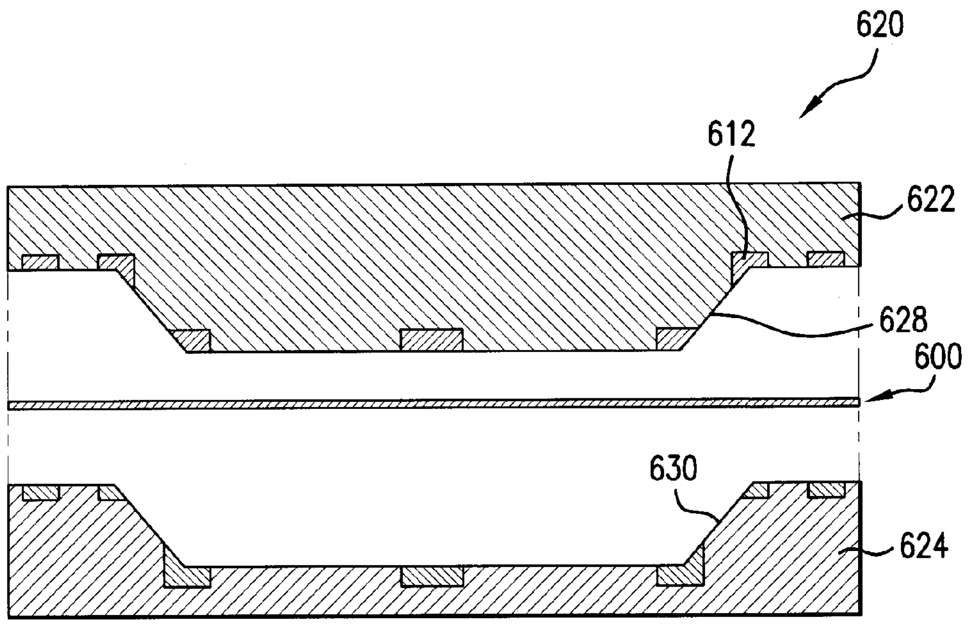
FIG. 39 is a cross-sectional view of a tool adapted to press form a container configuration, in an open position.
Figure 40:
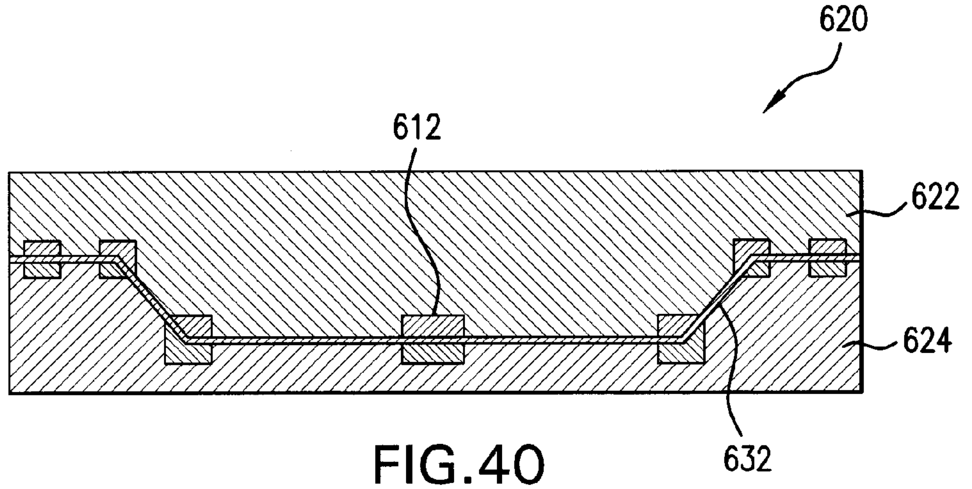
FIG. 40 is a cross-sectional view of the tool of FIG. 39 in the closed position.

FIGS. 39 and 40 depict a tool or die 620 comprising a plurality of bonding elements 612 used to press-form a container 632 including one or more closed cells (not shown) that expand when exposed to microwave energy. The tool 620 includes an upper punch or "male" section 622 that forms the inner section or concave portion of a container. The tool 620 further comprises a lower cavity or "female" section 624 that corresponds to the outer or convex portion of a container. Both the punch 622 and cavity 624 of the tool 620 include bonding elements 612. The bonding elements 612 are arranged in alignment with one another, so that when the tool 620 is closed to form the container, bonding elements 612 in the upper punch section 622 align with bonding elements 612 in the lower cavity section 624. Alternatively, the bonding elements 612 may be present in only the punch section 622 or cavity section 624 of the tool 620, but not both. In yet another alternative, bonding elements 612 are employed in the punch section 622 and cavity section 624, but not necessarily in alignment. The bonding elements 612 may be flush with the outer surface 628 of the punch 622 and the outer surface 630 of the cavity 624, or the bonding elements 612 may be arranged to be slightly raised with respect to the outer surfaces 628 and 630 of the punch and cavity, respectively. The arrangement of bonding elements 612 and the configuration of a tool 620 will depend on various factors such as the shape of the container and the shape, size, number, and arrangement of insulating cells.

In one aspect, a container is formed from various layers of base material 600, such as those shown in FIG. 35. To do so, the layers are arranged between the upper punch 622 and lower cavity 624. The tool 620 then is closed, thereby forming the layers into an insulating material having expandable cells. Simultaneously, the insulating material is formed into a container 632.

In another aspect, a container is formed from a microwave insulating sheet having pre-formed expandable cells, such as those shown and described herein. The insulating material including the expandable cells is positioned between the upper punch 622 and lower cavity 624. The tool then is closed, thereby forming the insulating material into a container.

Figure 43:
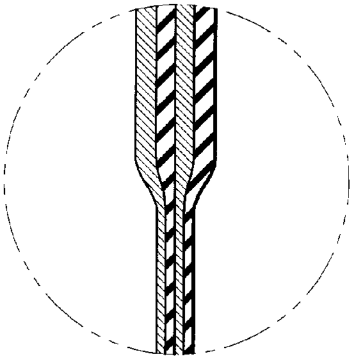
FIG. 43 is an enlarged view of a portion of the container of FIG. 42.
Figure 41:
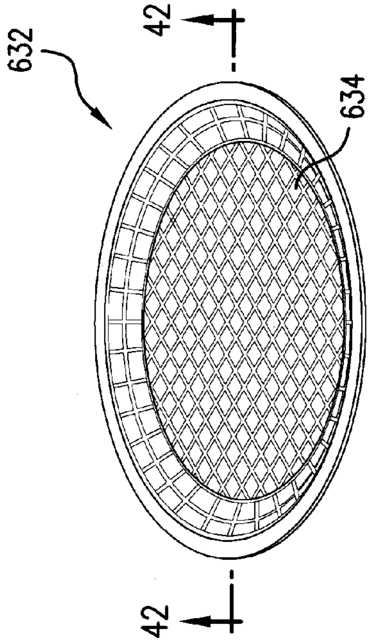
FIG. 41 is a perspective view of the container formed by the tool of FIG. 39 and FIG. 40.
Figure 42:
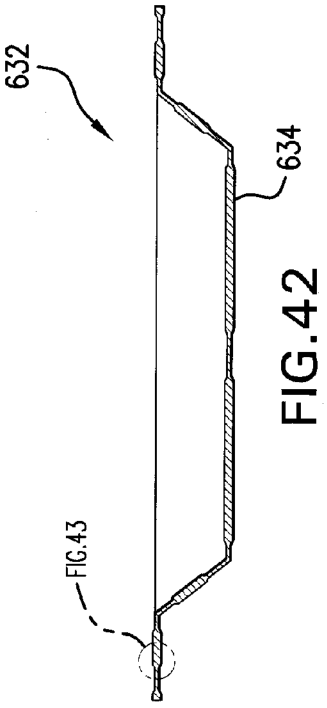
FIG. 42 is a cross-sectional view of the container of FIG. 41 taken along a line 42-42.

FIGS. 41-43 illustrate an exemplary container 632 that may be formed according to the present invention. In the upper punch 622 and lower cavity 624 of the tool 620, the bonding elements 612 define a grid pattern to form a pattern of closed cells 634 on the plate 632. The cavity 624 is shaped to define the outer surface of the container 632. The punch section 622 is shaped to define the inner surface of the container 632.

Figure 44:
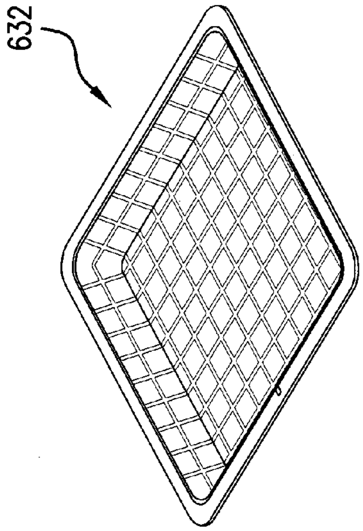
FIG. 44 is a perspective view of an alternative container shape formed with a tool with integrated thermo-mechanical bonding elements.

FIG. 44 is an example of an alternative container 632 that may be formed in accordance with the present invention. In this example, the tool includes a generally square punch and cavity arrangement (not shown).

VI. Method of Packaging a Food Item

According to another aspect of the present invention, a method and process for wrapping a food item in a sleeve of insulating microwave material is provided. If desired, the wrapped food item further may be overwrapped with a printed film.

Figure 45:
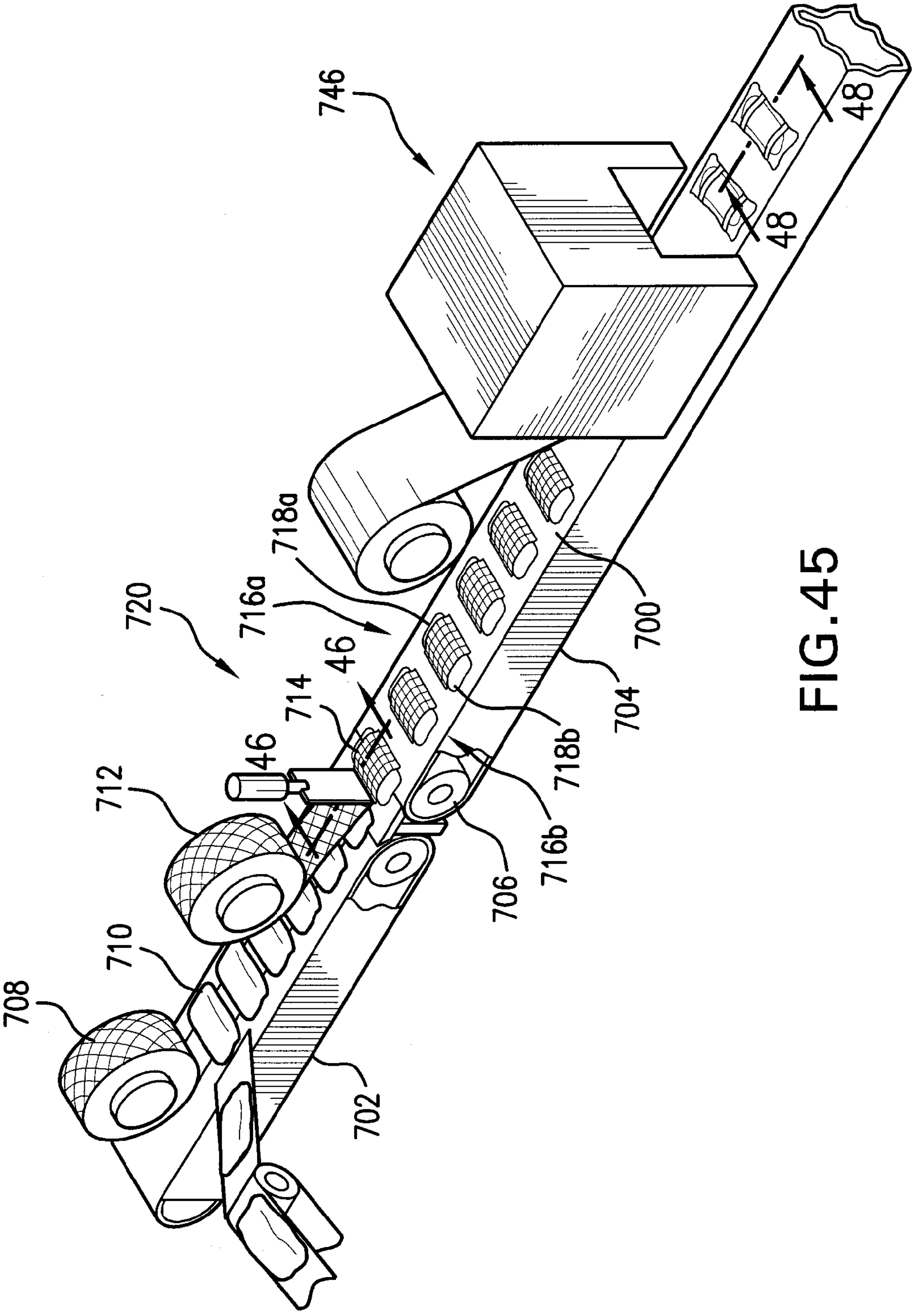
FIG. 45 is a perspective view of an exemplary process for forming an insulating microwave material sleeve around a food item in accordance with the present invention.

Turning to FIG. 45, an exemplary process according to the present invention is illustrated. A moving surface 700 includes one or more continuous belts 702 and 704 supported at each end by rollers 706. A first continuous roll of insulating microwave material 708 is unwound onto the belt surface 700. The food items 710 are placed on the insulating microwave material web 708. A second continuous roll of insulating microwave material 712 is unwound over the food items 710 supported on the first continuous web of material 708. Thus, the insulating material is provided along the bottom and top surfaces of the food item 710. In one aspect, the two webs of material 708 and 712 have a roughly equal width that is less than the width of the food item 710 (as measured transverse to the direction of conveyance). This dimensional relationship facilitates formation of a sleeve 714 having two open ends 716*a* and 716*b*, with a small portion of the ends 718*a* and 718*b* of the food item 710 exposed. It is possible, however, to provide any size webs of insulating microwave or other material. For example, it is possible to provide an arrangement to form a pocket with one open end, or to provide a pocket fully capable of enclosing the food item.

Figure 46:
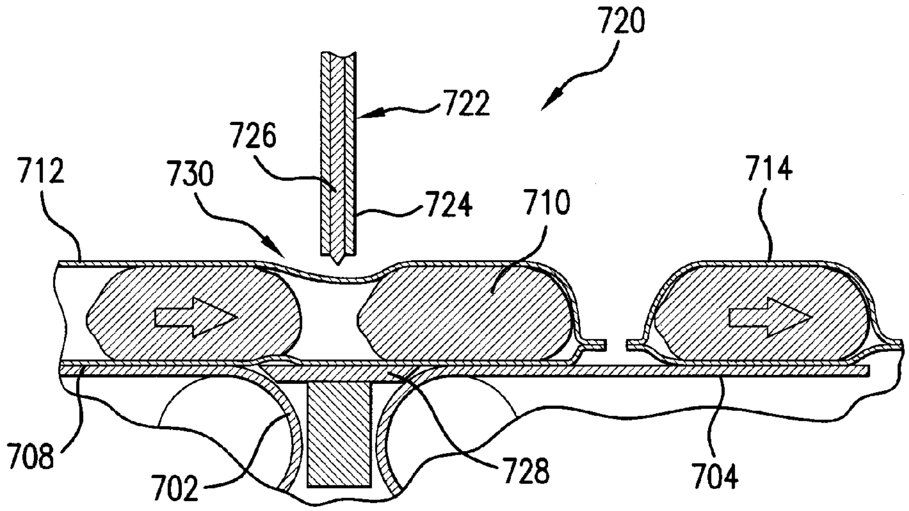
FIG. 46 is a cross-sectional view of the heat seal and cut-off tool of FIG. 45 taken along a line 46-46 in an open position.
Figure 47:
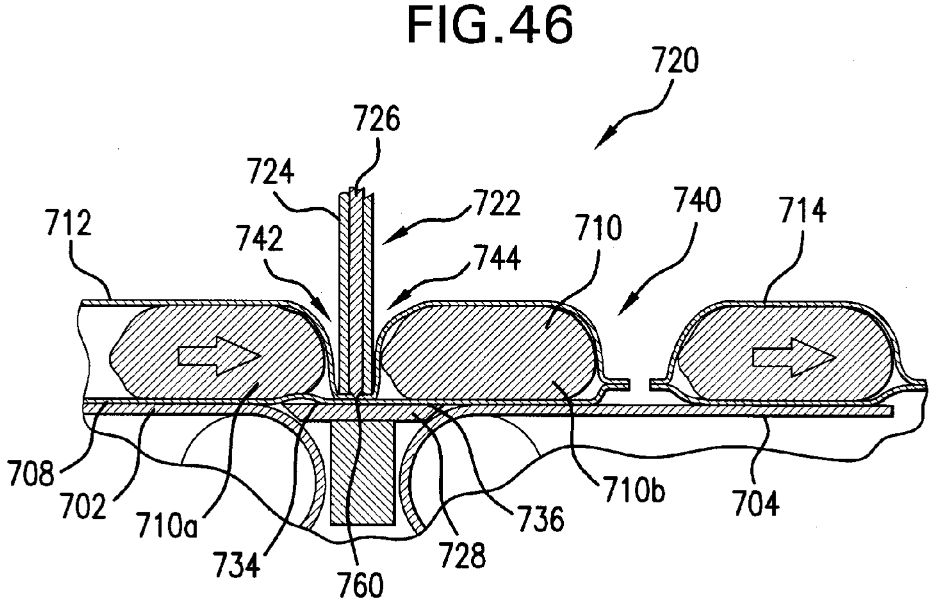
FIG. 47 is a cross-sectional view of the heat seal and cut-off tool of FIG. 45 taken along line 47-47 in an actuated position.

Turning to FIGS. 46 and 47, the wrapped food item 710 proceeds to an integrated heat seal and cut-off station 720. The heat seal and cut-off tool 722 comprises an outer heat seal tool 724 and an inner blade 726 coaxially aligned therewith. The heat seal 724 and cut-off tool 726 are shown integrated. However, the heat seal and cut-off functions may be separated if desired. A plate 728 is provided to support the food item 710 during actuation of the heat seal and cut-off tool 722. The food items 710 are moved incrementally over the flat plate 728 so that the leading edge 730 of the food item 710 is arranged adjacent, but not directly under the heat seal and cut-off tool 722. As shown in FIG. 45, the webs of material 708 and 712 are suspended between adjacent food items 710.

Referring now to FIG. 47, the heat seal and cut-off tool 722 is shown in the actuated position. When actuated, the heat seal portion 724 is pressed against the upper web of the material 712, pushing it down against the lower web of material 708. The heat seal tool 724 also presses down on the plate 728. When engaged with the plate 728, the heat seal tool 724 is energized to create a seal 732, such as a thermo-mechanical bond, between the first web of insulating material 708 and second web of insulating material 712. It is also possible to provide an amorphous or activatable adhesive (not shown) in the region where the heat seal tool will create the seal between the webs.

In an alternative configuration (not shown), the plate 728 may be substituted by a second heat seal tool. In such a configuration, the second heat seal tool may oppose the first heal tool of the heat seal and cut-off tool, so that upon actuation, the two heat seal tools work in concert to form a seal between the first and second webs of insulating materials. In one aspect, the face of the heat sealing tool may be shaped to receive the blade, thereby preventing direct contact with the second heat sealing tool. For example, the face of the second heat sealing tool may be curved, notched, slotted, or otherwise configured to receive the portion of the blade that extends beyond the interface between the first and second heat sealing tools. If desired, the blade may travel from the heat seal and cutoff tool housing during actuation.

Referring again to FIG. 46, when the heat seal and cut-off tool 722 is in the upper position, the cut-off portion of the tool 726 may be withdrawn inside the tool 722. In contrast, when the tool 722 is actuated, the blade 726 extends from the tool 722. When the blade 726 is pressed down against the bonded webs 708 and 712, as shown in FIG. 47, a line of separation 760 between food items 710 is formed. The line of separation 760 is located substantially along the centerline of the heat sealed area, so that the wrapping around each food item remains intact.

Figure 48:
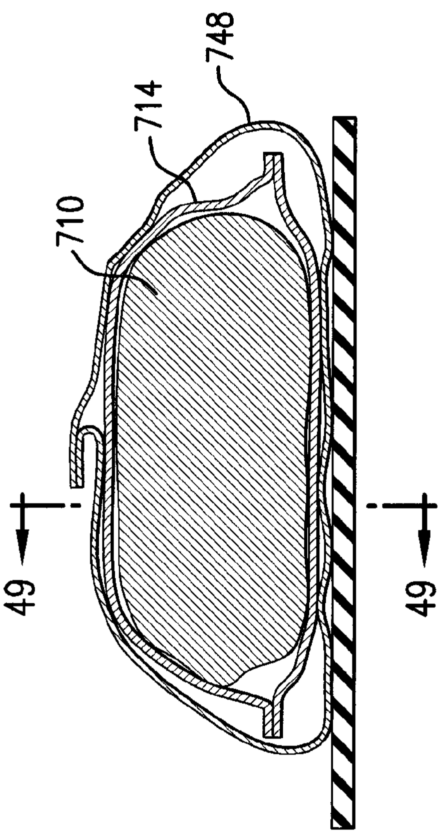
FIG. 48 is a cross-sectional view of the wrapped food item of FIG. 45 taken along a line 48-48.
Figure 49:
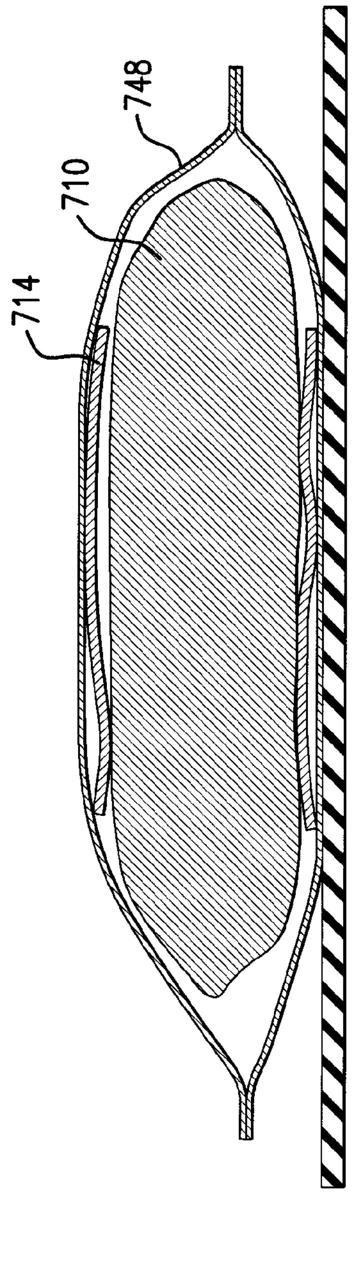
FIG. 49 is a cross-sectional view of a wrapped food item taken along line 49-49 of FIG. 48.

From FIG. 47, it can be seen that a first food item 710*a* is located on the incoming portion 734 of the plate 728 at the end of the first belt 730, and a second food item 710*b* is located on the outgoing portion 736 of the plate 728 at the end of the second belt 704. The first food item 710*a* will proceed to the location of the second food item 710*b* in the next movement of the belts 702 and 704. The leading portion 740 of the webs 708 and 712 over the second food item 710*b* was cut and heat sealed during the preceding actuation of the heal seal and cutoff tool 722. In the actuation of the heat seal and cut-off tool 722 in the current position, the leading portion 742 of the webs 708 and 712 for the first food item 710*a* are heat sealed, and the trailing portion 744 of the webs 708 and 712 for the second food item 710*b* is heat sealed. When the blade 726 separates the webs 708 and 712, the first food item 710*a* is fully processed with a sleeve 714 of insulating microwave material. If desired, the food items 710 with insulating microwave material sleeves 714 may be sent along the second belt 704 to a wrapping station 746 (FIG. 45) for providing a form seal over wrap with a printed film. FIGS. 48 and 49 depict a food item 710 with a sleeve 714 and overwrap 748.

VII. Package with Reconfigurable Insulating Lid

Figure 50:
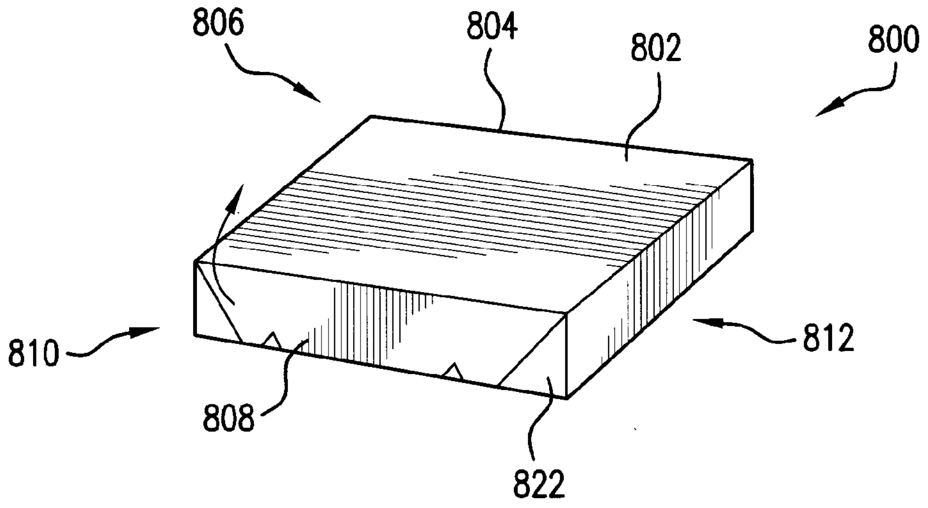
FIG. 50 is a perspective view of a package with an underfolding insulating lid, in accordance with one aspect of the present invention, in a closed position.
Figure 51:
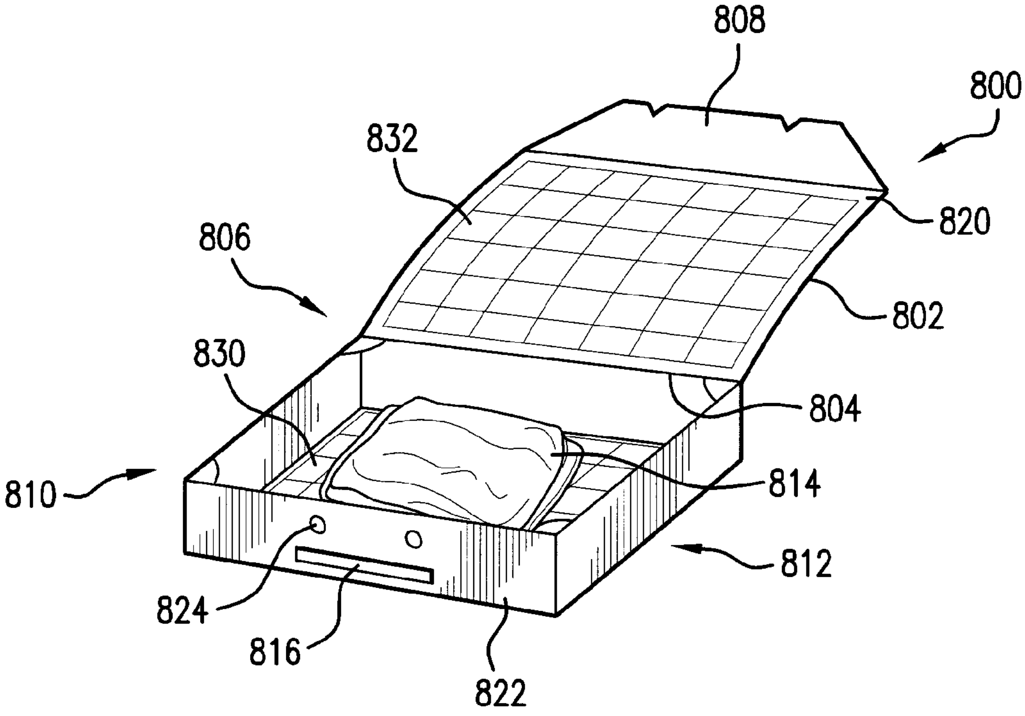
FIG. 51 is another perspective view of the package of FIG. 50 in an open position.
Figure 52:
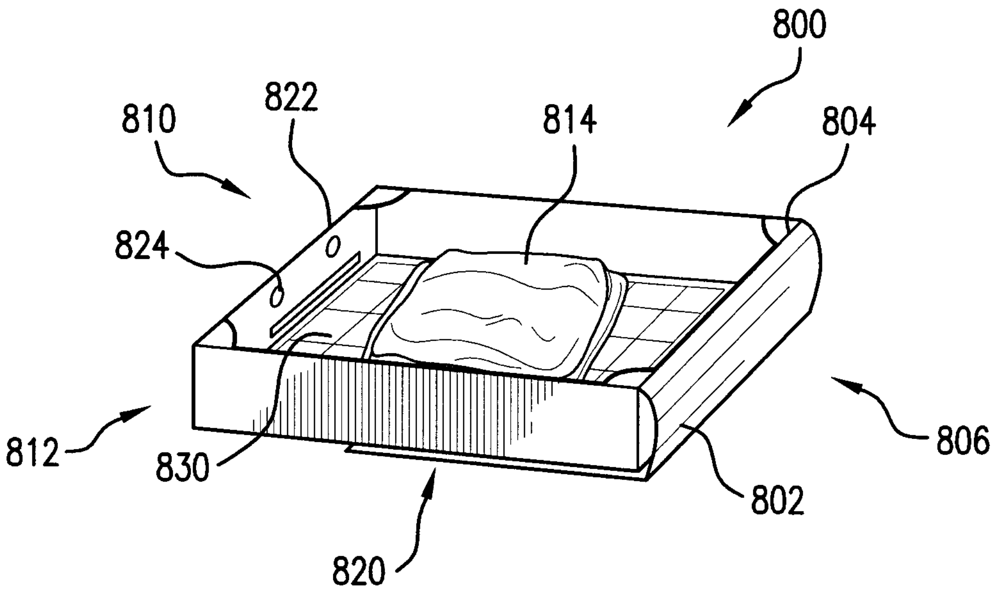
FIG. 52 is another perspective view of the package of FIGS. 50 and 51 with the lid folded under the tray.

In accordance with yet another aspect of the present invention shown in FIGS. 50-52, a package 800 having an insulating underfolding lid 802 is provided. The lid 802 includes a fold line 804 along one side 806, and a tab 808 or other closure or sealing means along the opposing side 810. The lid 802 has an interior surface 820 that may include an insulating material 832, with or without a susceptor layer, such as those described herein. The insulating material may include an oxygen barrier layer, variably sized and/or variably expanding cells, partially expanded cells, or numerous other features disclosed herein or contemplated hereby.

Prior to being opened (FIG. 50), the lid 802 covers the tray 812 and the food item (not shown) therein, and the tab 808 may be removably sealed to the front panel 822 of the package 800. To re-close the package 800 after being opened, the tab 808 may engage a corresponding slot 816 to secure the lid 802 in position. However, other means of securing the tab 808 are contemplated hereby.

As shown in FIGS. 51 and 52, when the food item 814 is ready to be heated, the package 800 is opened, and the lid 802 is folded under the tray 812. The tab 808 engages a second slot (not shown) or other retaining structure along the outside of the bottom surface 818. By doing so, the lid 802 forms an insulating layer between the bottom 818 of the tray 812 and the floor or glass tray of a microwave (not shown). The additional insulation provided by the lid 802 enhances the cooking of the food item 814 in the tray 812 by preventing heat loss to the surroundings.

If desired, additional insulating material 830 may be provided on one or more interior surfaces of the package to provide further insulation between the food item and the bottom of the tray and the floor of the microwave oven. Spacers along the lid surface that provide additional separation between the lid and the bottom of the tray in the folded-under position also may be provided. Ventilation holes 824 also may be provided.

It will be readily understood by those persons skilled in the art that, in view of the above detailed description of the invention, the present invention is susceptible of broad utility and application. Many adaptations of the present invention other than those herein described, as well as many variations, modifications, and equivalent arrangements will be apparent from or reasonably suggested by the present invention and the above detailed description thereof, without departing from the substance or scope of the present invention.

While the present invention is described herein in detail in relation to specific aspects, it is to be understood that this detailed description is only illustrative and exemplary of the present invention and is made merely for purposes of providing a full and enabling disclosure of the present invention. The detailed description set forth herein is not intended nor is to be construed to limit the present invention or otherwise to exclude any such other embodiments, adaptations, variations, modifications, and equivalent arrangements of the present invention. Accordingly, all directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, such joinder references do not necessarily infer that two elements are directly connected and in fixed relation to each other. Accordingly, the present invention is limited solely by the claims appended hereto and the equivalents thereof.

What is claimed is:

1. A microwave heating tray, comprising:

a first panel and a second panel foldably joined to one another; and an insulating microwave material overlying the first panel and the second panel, wherein the insulating microwave material comprises microwave energy interactive material supported on a first polymer film layer, a dimensionally stable substrate joined to the microwave energy interactive material, and a second polymer film layer joined to the dimensionally stable substrate in a predetermined pattern so that expandable cells are defined between the dimensionally stable substrate and the second polymer film layer, wherein the insulating microwave material is joined to the second panel so that upon sufficient exposure to microwave energy, the expandable cells expand and the insulating microwave material contracts, wherein the contracting of the insulating microwave material moves the second panel from a first position substantially coplanar with the first panel to a second position oblique to the first panel.

2. The microwave heating tray of claim 1, wherein the insulating microwave material is joined to the second panel by an adhesive.

3. The microwave heating tray of claim 1, wherein the insulating microwave material is not joined directly to the second panel.

4. The microwave heating tray of claim 1, further comprising a third panel foldably joined to the first panel so that the third panel is opposite the second panel, wherein the insulating microwave material is joined to the third panel.

5. The microwave heating tray of claim 4, further comprising a fourth panel and a fifth panel foldably joined to the first panel so that the fourth panel and fifth panel are opposite one another, wherein the insulating microwave material is joined to the fourth panel and fifth panel.

6. The microwave heating tray of claim 1, wherein at least one of the first polymer film layer and the second polymer film layer comprises biaxially-oriented polyester.

7. The microwave heating tray of claim 1, wherein the dimensionally stable substrate comprises paper.

8. The microwave heating tray of claim 1, wherein the closed cell comprises moisture.

9. The microwave heating tray of claim 1, wherein the microwave energy interactive material is operative for heating in response to microwave energy.

10. The microwave heating tray of claim 1, in combination with a food item having a surface that is desirably at least one of browned and crisped, wherein the food item is seated on the insulating microwave material overlying the first panel.

11. The combination of claim 10, wherein the moving of the second panel from the first position to the second position brings the microwave energy interactive material closer to the surface of the food item.

12. A microwave heating tray, comprising:

a main panel;

a plurality of side panels foldably joined to the main panel; and an insulating microwave material overlying the main panel and the side panels, the insulating microwave material being connected to the side panels, wherein the insulating microwave material is operative for at least partially contracting in response to microwave energy, wherein the contracting of the insulating microwave material moves the side panels from a first position substantially coplanar with the main panel to a second position oblique to the main panel.

13. The microwave heating tray of claim 12, wherein the insulating microwave material is connected to the side panels by an adhesive.

14. The microwave heating tray of claim 12, wherein the insulating microwave material is not joined directly to the main panel.

15. The microwave heating tray of claim 12, wherein the main panel is substantially square in shape, and the plurality of side panels comprises four side panels.

16. The microwave heating tray of claim 12, in combination with a food item, wherein the food item is seated on the insulating microwave material overlying the main panel.

17. The combination of claim 16, wherein the moving of the side panels from the first position to the second position brings the insulating microwave material overlying the side panels into closer proximity with the food item seated on the main panel.

18. The microwave heating tray of claim 12, wherein the insulating microwave material comprises microwave energy interactive material supported on a first polymer film layer, a dimensionally stable substrate joined to the microwave energy interactive material, and a second polymer film layer joined to the dimensionally stable substrate in a patterned configuration that defines closed cells between the dimensionally stable substrate and the second polymer film layer, wherein upon sufficient exposure to microwave energy, the closed cells expand and the second polymer film layer contracts so that the side panels are moved from the first position to the second position.

19. The microwave heating tray of claim 18, wherein at least one of the first polymer film layer and the second polymer film layer comprises biaxially-oriented polyester.

20. The microwave heating tray of claim 18, wherein the dimensionally stable substrate comprises paper.

21. The microwave heating tray of claim 18, wherein the closed cells comprise moisture.

22. The microwave heating tray of claim 18, wherein the microwave energy interactive material is operative for heating in response to microwave energy.

23. The microwave heating tray of claim 18, in combination with a food item having a surface that is desirably at least one of browned and crisped, wherein the food item is seated on the insulating microwave material overlying the main panel.

24. The combination of claim 23, wherein the moving of the side panels from the first position to the second position brings the microwave energy interactive material of the insulating microwave material overlying the side panels closer to the surface of the food item.

25. A microwave heating tray, comprising:

a main panel having a substantially square shape, so that the main panel includes four peripheral edges;

a side panel foldably joined to each of the four peripheral edges of the main panel; and an insulating microwave material overlying the main panel and each side panel, the insulating microwave material being connected to each side panel, wherein the insulating microwave material comprises microwave energy interactive material supported on a first polymer film layer, a paper layer joined to the microwave energy interactive material, and a second polymer film layer joined to the paper layer in a patterned configuration that defines a plurality of expandable cells between the paper layer and the second polymer film layer, wherein in response to sufficient exposure to microwave energy, the plurality of expandable cells expand and the insulating microwave material contracts, and the contracting of the insulating microwave material hinges each side panel toward the main panel.

* * * * *